United States Patent
Marappan et al.

(10) Patent No.: US 10,911,224 B1
(45) Date of Patent: Feb. 2, 2021

(54) SECURE NETWORK-ENABLED LOCK

(71) Applicant: Amazon Technologies, Inc., Seattle, WA (US)

(72) Inventors: Priti Marappan, Sunnyvale, CA (US); Darren Ernest Canavor, Redmond, WA (US); Daniel Wade Hitchcock, Bothell, WA (US); Bharath Kumar Bhimanaik, Seattle, WA (US); Andrew Jay Roths, Kenmore, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/927,915

(22) Filed: Mar. 21, 2018

(51) Int. Cl.
  *H04L 9/08* (2006.01)
  *H04W 12/04* (2009.01)
  *E05B 17/22* (2006.01)

(52) U.S. Cl.
  CPC ............ *H04L 9/0819* (2013.01); *E05B 17/22* (2013.01); *H04W 12/04* (2013.01); *E05Y 2400/66* (2013.01); *E05Y 2400/80* (2013.01); *E05Y 2900/132* (2013.01)

(58) Field of Classification Search
  CPC ...... H04L 9/0819; E05B 17/22; H04W 12/04; E05Y 2400/80; E05Y 2900/132; E05Y 2400/66
  See application file for complete search history.

(56) References Cited

U.S. PATENT DOCUMENTS

| | | | | |
|---|---|---|---|---|
| 9,154,483 | B1* | 10/2015 | Haskin | H04L 63/08 |
| 10,121,301 | B1* | 11/2018 | Ren | G07C 9/00896 |
| 10,134,212 | B1* | 11/2018 | Ren | G07C 9/00571 |
| 2013/0342314 | A1* | 12/2013 | Chen | G07C 9/00309 340/5.65 |
| 2015/0097689 | A1* | 4/2015 | Logue | G08B 25/003 340/632 |
| 2016/0189454 | A1* | 6/2016 | Johnson | H04W 4/80 340/5.61 |
| 2016/0212137 | A1* | 7/2016 | Pottier | H04L 63/101 |
| 2016/0319569 | A1* | 11/2016 | Johnson | E05B 39/04 |
| 2017/0002586 | A1* | 1/2017 | Lee | E05B 47/0012 |
| 2017/0116561 | A1* | 4/2017 | Saddler | G06Q 10/063116 |
| 2017/0243455 | A1* | 8/2017 | Johnson | E05B 47/0012 |
| 2017/0336945 | A1* | 11/2017 | Laskowitz | G06F 3/0482 |
| 2017/0373855 | A1* | 12/2017 | Pritchard | H04L 67/12 |
| 2018/0026799 | A1* | 1/2018 | Pottier | H04L 9/3265 713/156 |
| 2018/0118163 | A1* | 5/2018 | Murakami | G07C 9/00 |
| 2018/0130273 | A1* | 5/2018 | Eid | G07C 9/00309 |

* cited by examiner

*Primary Examiner* — Brian E Miller

(74) *Attorney, Agent, or Firm* — Davis Wright Tremaine LLP

(57) ABSTRACT

A method of implementing a network-enabled secure door lock, comprising determining, at a first component of the lock, a nonce; wirelessly transmitting the nonce to a second component of the door lock, the first component and second component selectively mechanically engagable with one another to prevent relative movement between the first component and second component to prevent opening of a door; receiving, at the first component, a first message; using a cryptographic key associated with the second component and the nonce to validate the first message; and as a result of determining that the message is valid, transmitting a second message indicating that the first component and second component have become mechanically engaged with one another.

20 Claims, 17 Drawing Sheets

SECURE NETWORK-ENABLED LOCK

BACKGROUND

Network-enabled door locks (sometimes called "smart door locks" or simply "smart locks") are becoming increasingly popular as the world embraces the "Internet of Things" (IoT). The IoT expands the functionality of everyday objects, such as appliances, personal assistants, mobile phones, etc., with embedded computing devices connected through the Internet via a variety of wired and wireless links.

Network-enabled door locks offer a variety of advantages to a consumer, such as allowing the door to be locked or unlocked remotely via a network (e.g., the Internet), granting entry to trusted parties (such as shipping companies), and unlocking the door (via a mobile device, for example) if someone has misplaced their keys. However, many of the network-enabled door locks available today, lack a reliable method for verifying that the door is truly locked (for example, the deadbolt may be extended but not within the corresponding strike plate). This creates a situation where one may think that a door has been successfully locked when, in fact, the door has been left open, perhaps accidentally or perhaps maliciously.

BRIEF DESCRIPTION OF THE DRAWINGS

Various techniques will be described with reference to the drawings, in which.

DETAILED DESCRIPTION

Figure 1A:
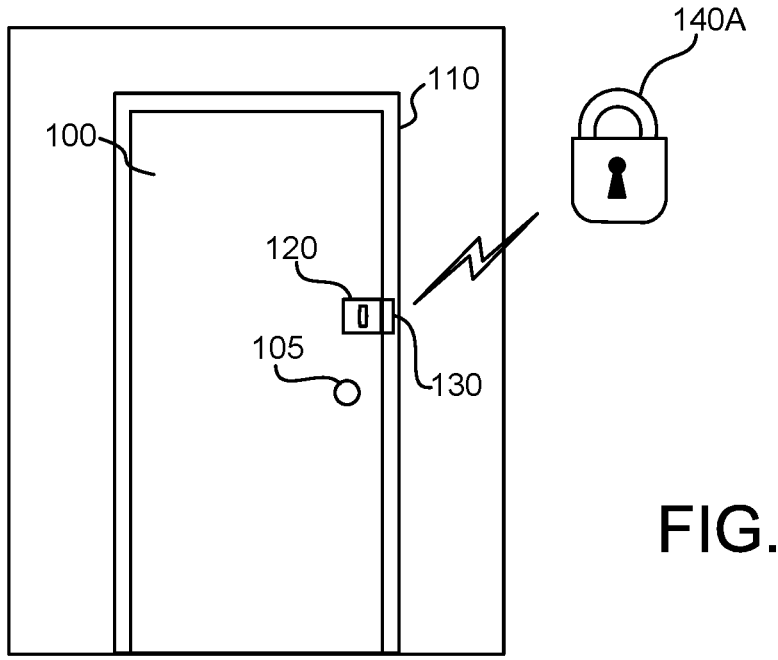
FIG. 1A illustrates an example diagram of a network-enabled door lock in a closed position in accordance with an embodiment.

Techniques described and suggested herein include systems, methods, and processes for a network-enabled door lock which reports its status with a high degree of accuracy and confidence, and which uses enhanced security techniques to prevent hacking and/or unauthorized access to an area. A network-enabled door lock may have two primary components, a deadbolt component mounted on or near the physical deadbolt mechanism on the door, and a strike plate component mounted on or near the physical strike plate typically mounted on the door jam. A network-enabled door lock may also comprise any number of sensing devices, either integral to one or more of the components of the door lock or separately located but positioned to take measurements related to the environment of a door, including, but not limited to, the status of the door itself (for example, closed or open), the status of the door lock and its components (for example, deadbolt is extended/retracted, deadbolt is seated in strike plate or latch hole, etc.), and/or ambient conditions of the door (for example, a temperature reading, a light measurement, an audio level, etc.).

In one example, the network-enabled door lock feeds information gathered from a variety of sensors and other network-enabled devices into an algorithm or "door status model" to determine its status (for example, locked/unlocked) with a high degree of confidence. The sensors used to generate information for use in the door status model may be integral to one of the components of the networked-enabled door lock or may be separate sensors arranged near the door lock or otherwise in a position to provide information relative to the status of the door lock. For example, sensors integral to the door lock may include inertial sensors, position sensors, proximity sensors, and/or radio frequency identification (RFID) sensors. As another example, sensors which may be physically separate from the network-enabled door lock and/or the door on which it is mounted may include video devices, light sensors, temperature sensors, and/or audio capture devices.

In an embodiment, the network-enabled door lock may rely on a separate device, such as a personal digital assistant or a separate network-enabled device, to interact with the sensors and devices to gather information on the position and orientation of the door, as well as the status of the components of the door lock themselves. This separate device may poll or interrogate the devices, sensors, and door lock components, gather information, and feed the information into a door status model, the output of which may be an indication of the door status. The indication of the door status may be associated with a confidence factor, the confidence factor determined by the model based on the number and type of devices from which information was gathered. The inclusion of data from a larger, more diverse set of sensors and devices may lead to a higher confidence factor than that derived from data from a smaller, more limited set of sensors and devices.

In an embodiment, the network-enabled door lock may use cryptographic techniques to improve security and help prevent hacking and replay attacks, as well as to provide additional data for inclusion into a door status model. For example, the components of the network-enabled door lock may use symmetric or asymmetric keys to encrypt communication among components and other network devices and sensors. In an embodiment, the network-enabled door lock may further use a nonce as part of an authentication protocol to ensure previous communications between components cannot be reused in a "replay" attack. A nonce may be an arbitrary number (for example, a random or pseudo-random number) that is used only once in encrypted communications. The nonce may be paired with or based on a suitably fine-grained timestamp, such that attempted reuse of the nonce at a time outside of a range on either side of the timestamp may indicate a replay attack.

In an embodiment, the network-enabled door lock may use asymmetric keys to enable cryptographic techniques. A strike plate component may store a private key and provide the corresponding public key to a deadbolt component by an appropriate means, such as through a certificate provided by a trusted certificate authority (CA). In an alternate embodiment, the deadbolt component may store a private key and provide the corresponding public key to the strike plate component. In yet another alternate embodiment, both the deadbolt component and strike plate component may store their own, individual private keys, and an authentication protocol used between components may require the verification of encrypted communications in both directions before confirming the status of the door lock.

As one skilled in the art will appreciate in light of this disclosure, certain embodiments may be capable of achieving certain advantages, including some or all of the following: (1) improving the security of a system controlling physical access to a resource, (2) improving the security of communications between components of a distributed system, (3) improving the user interface for a computer-implemented authentication system, (4) improving the accuracy and completeness of information available on a network-based resource, etc.

In the following and preceding description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1A illustrates an example diagram of a physical access control system that includes a locking/detecting assembly that includes first and second components 120, 130, examples of which include a network-enabled door lock with a deadbolt component 120 and corresponding strike plate component 130. Although a network-enabled door lock with a deadbolt 120 and strike plate 130 is used in the figures, this is not meant to be limiting. Other examples of mechanisms for physical access control systems include, but are not limited to, window latches, pins/members on garage door locks that extend into garage door rails, doorknob latches, or any other appropriate mechanism.

A deadbolt component 120 is mounted on or near the physical deadbolt mechanism of a door 100. In a closed, locked position, the deadbolt component 120 will interface or interact with a corresponding strike plate component 130 mounted in or on the door jamb 110 to prevent relative motion in at least one direction between the deadbolt component 120 and the strike plate component 130. While the lock components are in a "locked" position, relative motion may be prevented in one direction while allowed in a separate direction. For example, the bolt of the deadbolt component 120 may be allowed to move in an axial direction (i.e., the bolt may move in and out of the strike plate component 130 as the door is locked and unlocked), but movement is prevented in directions orthogonal to the axis when the bolt extends into the strike plate component 130. Throughout this specification, the term "mechanically engaged" shall be used to indicate a "locked" state of the network-enabled door lock whereby two physical objects (e.g., deadbolt and strike plate) interface with each other to restrict relative motion. For example, in an embodiment, the locked state may occur when a physical deadbolt of the lock is extended beyond the edge of door 100 such that it enters into the door jamb 110 and extends into the strike plate component 130. Note that mechanical engagement does not necessarily include physical contact (e.g., when a deadbolt protrudes into a hole formed by the strike plate but without contacting the strike plate. Also, the term mechanical engagement does not necessarily necessitate a physical part of one component extending into or making contact with a physical part of the other component. Examples of this include, but are not limited to, a door being held closed and locked by a magnetic lock, and the force of a motor holding a door closed and locked (e.g., a garage door), the motor or hydraulics of a driveway gate, or any other appropriate type of interaction between the components of a physical access control mechanism and/or its environment. When the network-enabled door lock determines that the deadbolt component 120 and strike plate component 130 are adequately mechanically engaged, a "locked" indication 140A may be provided, indicating the statue of the network-enabled door lock is "locked." The "locked" indication 140A may be transmitted wirelessly to another system, such as a mobile device or personal digital assistant (not shown), for display or pronouncement to a user.

In an embodiment, the network-enabled door lock is used with the door latch and strike plate associated with a standard (non-deadbolt) doorknob 105. The principles involved are the same. A door latch of the doorknob 105 (instead of a physical deadbolt) extends into a strike plate component similar to strike plate component 130. Also, as previously mentioned, the components of a lock may operate without physically being in contact with each other or extending into each other. For example, the "lock" of a garage door may be the motor of the garage door drive holding the door closed until the appropriate signal is received from an authorized user (e.g., a driver with a garage door opener). The terms "deadbolt" and "strike plate" are provided as example embodiments only and are not intended to be limiting in any way. Generally, door locks may involve other mechanisms for physically restraining a door and the techniques described herein may be adapted for use with such mechanisms.

It should be noted that, although a door is used throughout the specification for illustration purposes, the same concepts can be applied to any physical access control mechanism, including, but not limited to, a house exterior door, an interior door, car doors, safe/vault doors, garage doors, refrigerator doors, windows, hatches, airlocks, or any other mechanism which controls access to a physical space.

It should also be noted that the network-enabled door lock can be divided into any number of physical components. Examples described herein describing a deadbolt component and a strike plate component are intended to be illustrative only and not limiting in any way.

For the purposes of this specification, the terms "sensing device" and "sensor" shall be used interchangeably to refer to any of the following: electronic sensors, software applications, web services, network-enabled devices, mobile devices, personal digital assistants, IoT devices, or any other appropriate device which can collect and share measurements and/or information related to an environment of a physical access control mechanism.

Figure 1B:
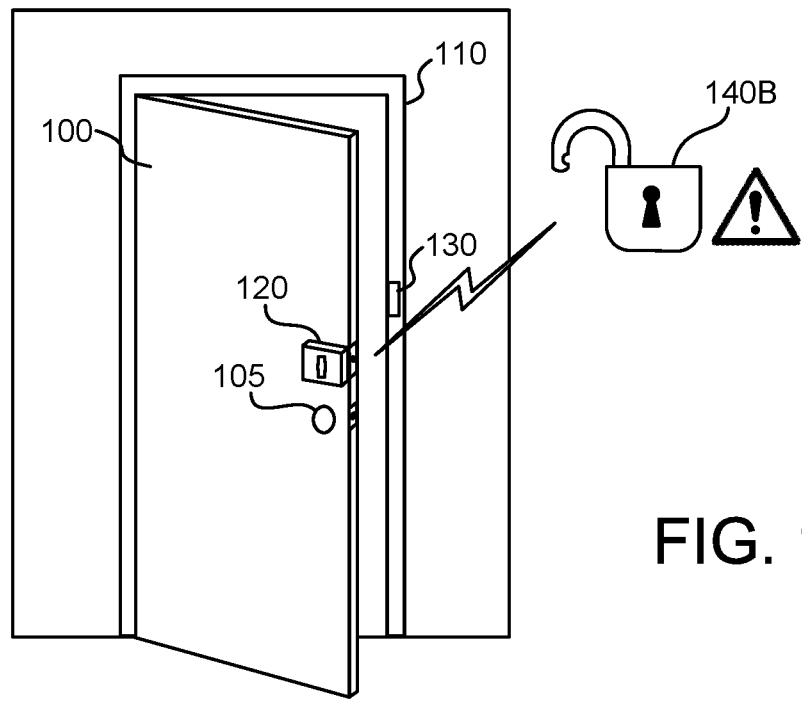
FIG. 1B illustrates an example diagram of a network-enabled door lock in an open position in accordance with an embodiment.

FIG. 1B illustrates an example diagram of a network-enabled door lock in an open position in accordance with an embodiment. FIG. 1B shows the example network-enabled door lock of FIG. 1A, but with the door in an open position, such that the deadbolt component 120 is physically separated from the strike plate component 130. That is, the deadbolt component 120 is not mechanically engaged with the strike plate component 130. In this position, the system provides an "unlocked" indication 140B. The network-enabled door lock may provide an "unlocked" indication 140B even if the physical deadbolt mechanism is extended beyond the edge of door 100. In other words, extending the physical deadbolt mechanism when the deadbolt component 120 is not in alignment with the strike plate component (and, therefore, the deadbolt component 120 and strike plate component 130 are not mechanically engaged) does not generate a status of "locked."

Figure 2:
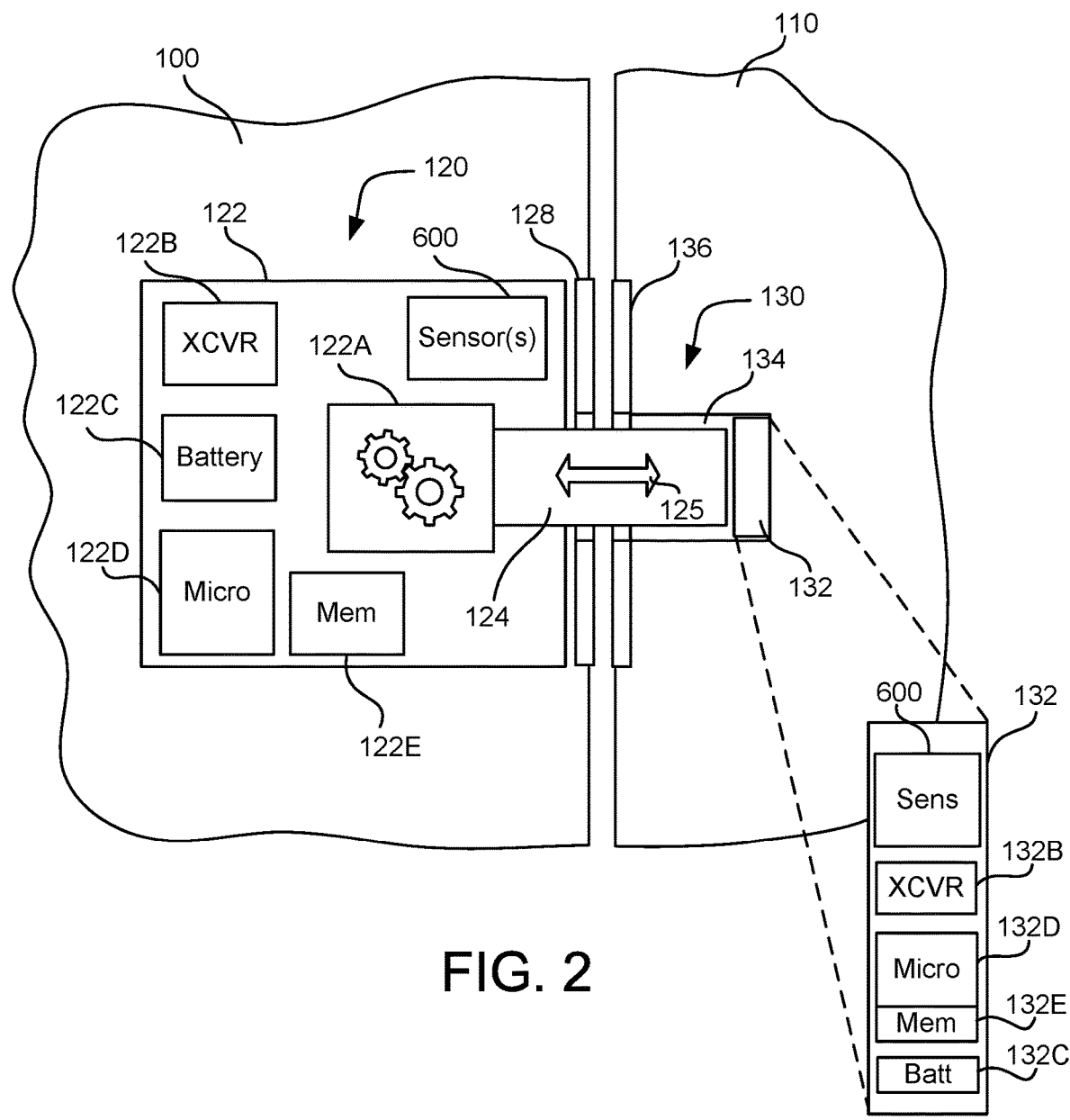
FIG. 2 illustrates an example diagram of a cutaway view of a network-enabled door lock in accordance with an embodiment.

FIG. 2 illustrates an example diagram of a cutaway and component view of a network-enabled door lock in accordance with an embodiment. The network-enabled door lock comprises a deadbolt component 120 and a strike plate component 130. The cutaway view of FIG. 2 illustrates a functional schematic of an embodiment of both the deadbolt component 120 and the strike plate component 130. In the embodiment of FIG. 2, the deadbolt component 120 comprises deadbolt electronics 122, and physical deadbolt 124 which may be extended out through the deadbolt face plate 128 to engage the strike plate component 130 or withdrawn into deadbolt component 120 to allow door 100 to be opened (i.e., the physical deadbolt 124 may be allowed to move in axial direction 125 relative to the strike plate component to engage/disengage the lock mechanism). The physical deadbolt 124, in an embodiment, is extended and retracted by an actuator 122A. The actuator 122A may be an electric motor, a linear actuator, a simple gearing mechanism tied to an external actuator, or any appropriate device for extending and retracting the physical deadbolt 124. The actuator 122A may be commanded via electrical or other signals to extend and/or retract by software instructions stored in memory 122E and executed by microprocessor 122D. A battery 122C supplies power to the elements of the deadbolt component 120. A wireless transceiver 122B allows communications with external sensors and network-enabled devices.

In some implementations, one or more sensors 600 are within the deadbolt component 120. These sensors may include, but are not limited to, inertial sensors for detecting a movement in one or more axes of rotation, position sensors to detect a position of the door 100 relative to the door jamb 110, proximity sensors for sensing the proximity of other elements of the system (such as the strike place component), radio frequency identification (RFID) devices, camera devices for detecting fiducial markings on other components to determine distance or position relative to those components, light sensors for detecting ambient light conditions, and/or any other appropriate type of sensor.

The strike plate component 130, in this example, comprises a physical strike plate 136 mounted on an inside edge of door jamb 110, through which the physical deadbolt 124 passes to become mechanically engaged with latch hole 134 formed by the strike plate component 130. Installed in or near latch hole 134 is the strike plate electronics 132. In an embodiment, the strike plate electronics 132 may comprise elements similar to those of deadbolt electronics 122, including a transceiver 132B, a microprocessor 132D, memory 132E, a battery 132C, and optional sensors 600. However, alternate embodiments of strike plate electronics 132 may exist. For example, in an embodiment, strike plate electronics 132 may comprise an RFID coil or circuit which becomes powered only when brought in proximity to an electromagnetic field of the deadbolt component 120. In another example embodiment, strike plate electronics 132 may comprise a simple microprocessor 132D, battery 132C, and transceiver 132B.

It should be appreciated that alternate embodiments may have numerous variations from that described above. For example, the logic to control the actuator 122A may be provided through a hardware circuit rather than software instructions. As another example, both battery 132C and transceiver 132B could be replaced with hard-wired equivalents routed across door jamb 110. Both the deadbolt electronics 122 and strike plate electronics 132 may vary in the number and type of elements they contain. Sensors 600 may be integral to the deadbolt electronics 122 and strike plate electronics 132, or they may be remotely located and in communication with deadbolt electronics 122 and strike plate electronics 132. In an embodiment, sensors 600 may not communicate with deadbolt electronics 122 and strike plate electronics 132, but may instead communicate to an external system responsible for gathering data to determine the door status. Numerous other variations are within the spirit of the present disclosure.

Figure 3A:
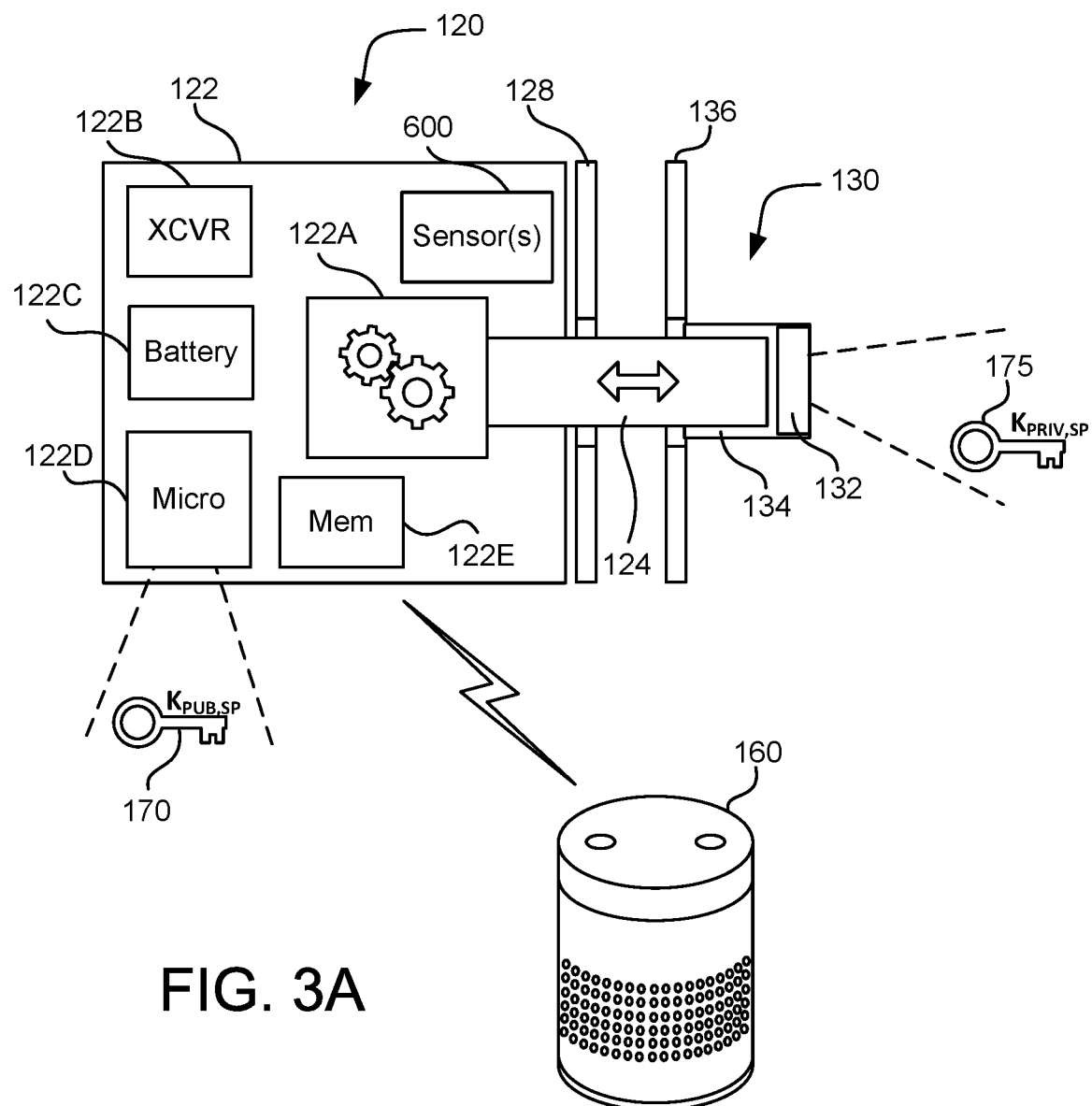
FIG. 3A illustrates an example network-enabled door lock executing an authentication protocol in accordance with an embodiment.
Figure 3B:
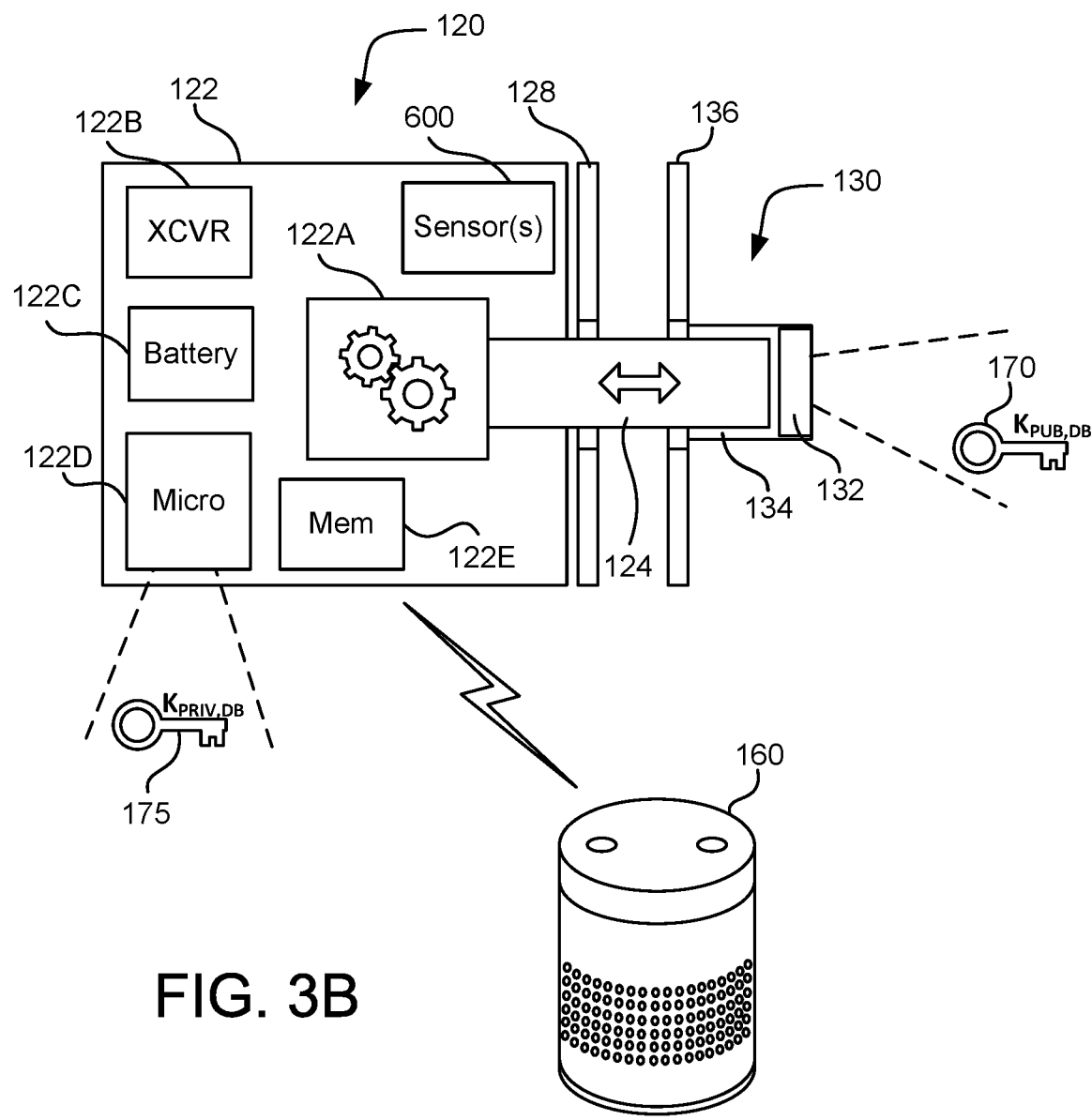
FIG. 3B illustrates an example network-enabled door lock executing an authentication protocol in accordance with an embodiment.
Figure 3C:
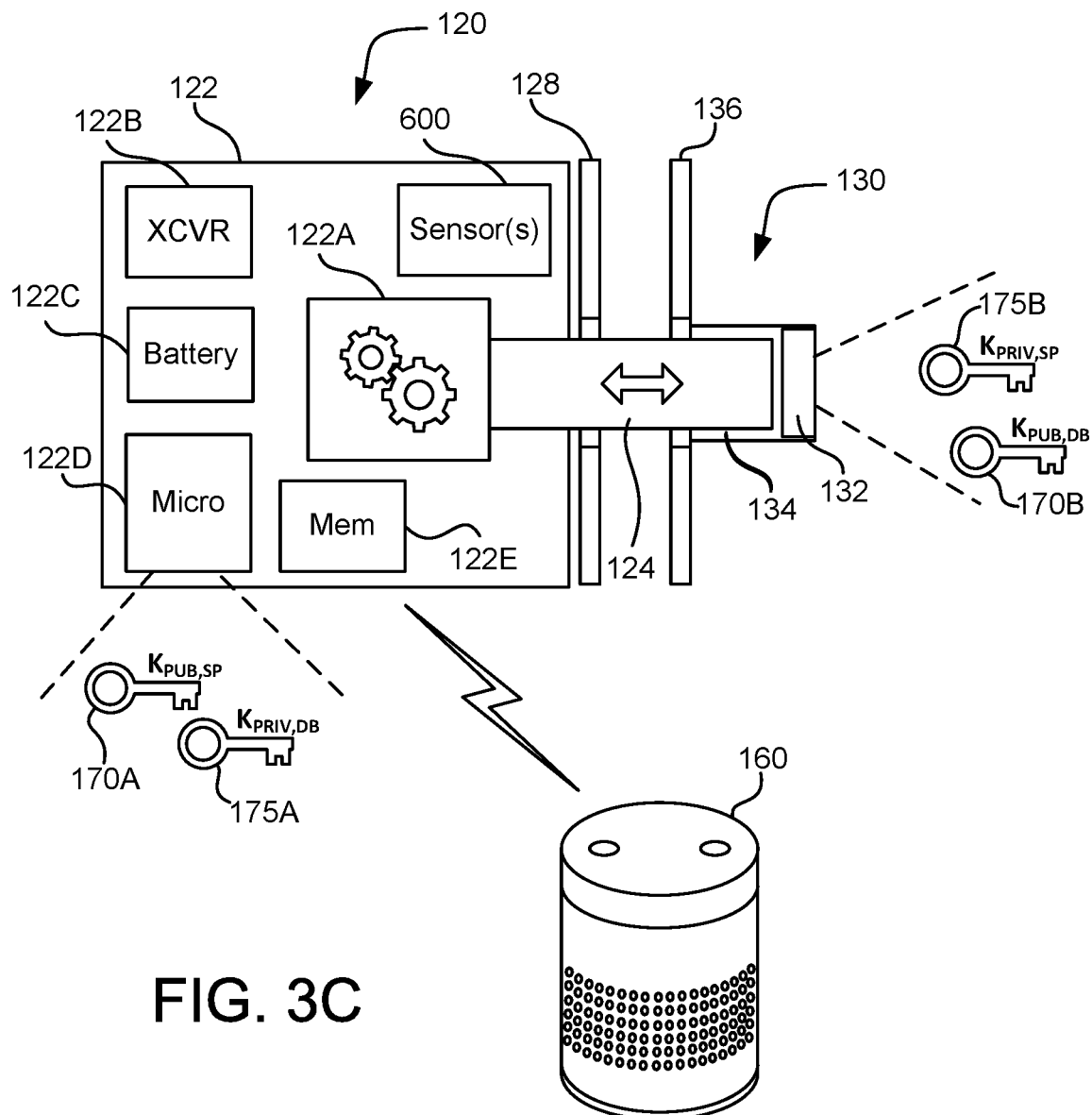
FIG. 3C illustrates an example network-enabled door lock executing an authentication protocol in accordance with an embodiment.

FIGS. 3A-3C illustrate examples of a network-enabled door lock executing an authentication protocol using asymmetric key encryption. FIG. 3A shows the network-enabled door lock of FIG. 2, comprising deadbolt component 120 and strike plate component 130. The network-enabled door lock is in wireless communication with a user device 160. User device 160 may be a mobile phone, personal digital assistant, computer, laptop, tablet, or any other appropriate electronic user device.

In an example use case, after receiving a command to lock the door from user device 160 via transceiver 122B, microprocessor 122D may send a command to actuator 122A to extend physical deadbolt 124. Upon completing the extension of physical deadbolt 124, various methods of verifying that physical deadbolt 124 is properly extended and seated within latch hole 134 through physical strike plate 136 may be employed. These methods may include, for example, reading the output of sensors 600 to determine if the physical components are mechanically engaged. Following verification of mechanical engagement, the deadbolt component 120 and strike plate component 130 may use asymmetric key authentication to confirm agreement on mechanical engagement before sending a status message to user device 160. The deadbolt electronics 122 and strike plate electronics 132 may utilize a public-private key pair along with a nonce to communicate and confirm mechanical engagement. For example, in the embodiment of FIG. 3A, strike plate electronics 132 may maintain a private key 175, and deadbolt electronics 122 may use a public key 170 corresponding to the private key 175 of the strike plate. The deadbolt electronics 122 may obtain the public key 170 of the strike plate from a digital certificate of the strike plate electronics 132, obtained through a trusted certificate authority, perhaps via electronic communications with the user device 160. Additional details on this use case will be provided in FIGS. 4A through 4D.

Throughout the specification, certain notations shall be used to indicate public and private keys, encrypted messages, and the like. For example, the notation $K_{PUB,SP}$ shall be used to indicate a public key of the strike plate component, where "K" indicates a cryptographic key, "PUB" indicates the key is a public key, and "SP" indicates the cryptographic key is associated with the strike plate component. Similarly, the notation $K_{PRIV,DB}$ indicates a private cryptographic key associated with the deadbolt (DB) component. In FIGS. 4A to 4D of this specification, the following notation shall be used:

Message [$K_{PRIV,DB}$ (X)]

This notation indicates that data "X" (such as a nonce) has been encrypted with the private cryptographic key of the deadbolt component and transmitted as a message to a recipient. The general form "Message[X]" shall mean "a message containing content X."

It should be noted that the use of use of the term "key" as used throughout this specification shall generally be used to be synonymous with the term "cryptographic key." If an actual physical key, such as the physical key that is manually inserted into the keyhole of a deadbolt or doorknob lock, is referred to in this specification, it shall be referred to as a "physical key" or in other such way as to distinguish from cryptographic keys.

FIGS. 3B and 3C illustrates alternate embodiments of the network-enabled door lock of FIG. 3A. Only those differences as seen from FIG. 3A will be discussed here. In FIG. 3B, the roles of the deadbolt electronics 122 and strike plate electronics 132 are reversed. In the embodiment of FIG. 3B, it is the deadbolt electronics 122 that maintains the private key 175, and strike plate electronics 132 which uses a public key 170 corresponding to the private key 175 of the deadbolt. The strike plate electronics 132 may obtain the public key 170 of the deadbolt from a digital certificate of the deadbolt electronics 122, obtained through a trusted certificate authority, perhaps via electronic communications with the user device 160.

In FIG. 3C, both the deadbolt electronics 122 and strike plate electronics 132 maintain private and public keys, allowing bidirectional communications and authentication. The deadbolt electronics 122 will maintain its own private key 175A and obtain a public key associated with the strike plate 170A. Similarly, the strike plate electronics 132 will maintain its own private key 175B and obtain a public key associated with the deadbolt 170B. Additional details on the authentication protocols used by deadbolt electronics 122 and strike plate electronics 132 will now be described via sequence diagrams in FIGS. 4A through 4D.

It should be noted that, although the examples of FIGS. 3A-3C show the use of asymmetric keys, other variations, including variations where a symmetric key is shared between the two entities (e.g., between a strike plate component and a deadbolt component) can be used to encrypt and/or digitally sign the nonce or other sensitive data. For example, a strike plate component and a deadbolt component may use respective asymmetric key pairs to perform a Diffie Hellman or other key exchange to exchange symmetric keys that are used with nonces in cryptographic algorithms to demonstrate access to the exchanged symmetric key. Additional detail regarding various cryptographic algorithms is discussed below in regard to FIG. 6.

It should also be noted that one or more of the physical lock components (i.e., the deadbolt component 120, the strike plate component 130, or parts of either component) may need to be replaced independently of the other component. For example, if the deadbolt component fails or is broken, it may be replaced with a new deadbolt component. This may require that the remaining component be rekeyed (i.e., the cryptographic keys may need to be revoked and new keys and/or cryptographic secrets exchanged between the remaining component and the newly installed component). This may be done by forcing a new key exchange, replacing cryptographic session keys with a protocol such as Temporal Key Integrity Protocol (TKIP), issuing a new digital certificate, or by any other appropriate method of cryptographic rekeying. Cryptographic rekeying may also be a standard process used by the system, even when none of the lock components are replaced. The system may use cryptographic rekeying as an additional security measure to prevent replay attacks.

Figure 4A:
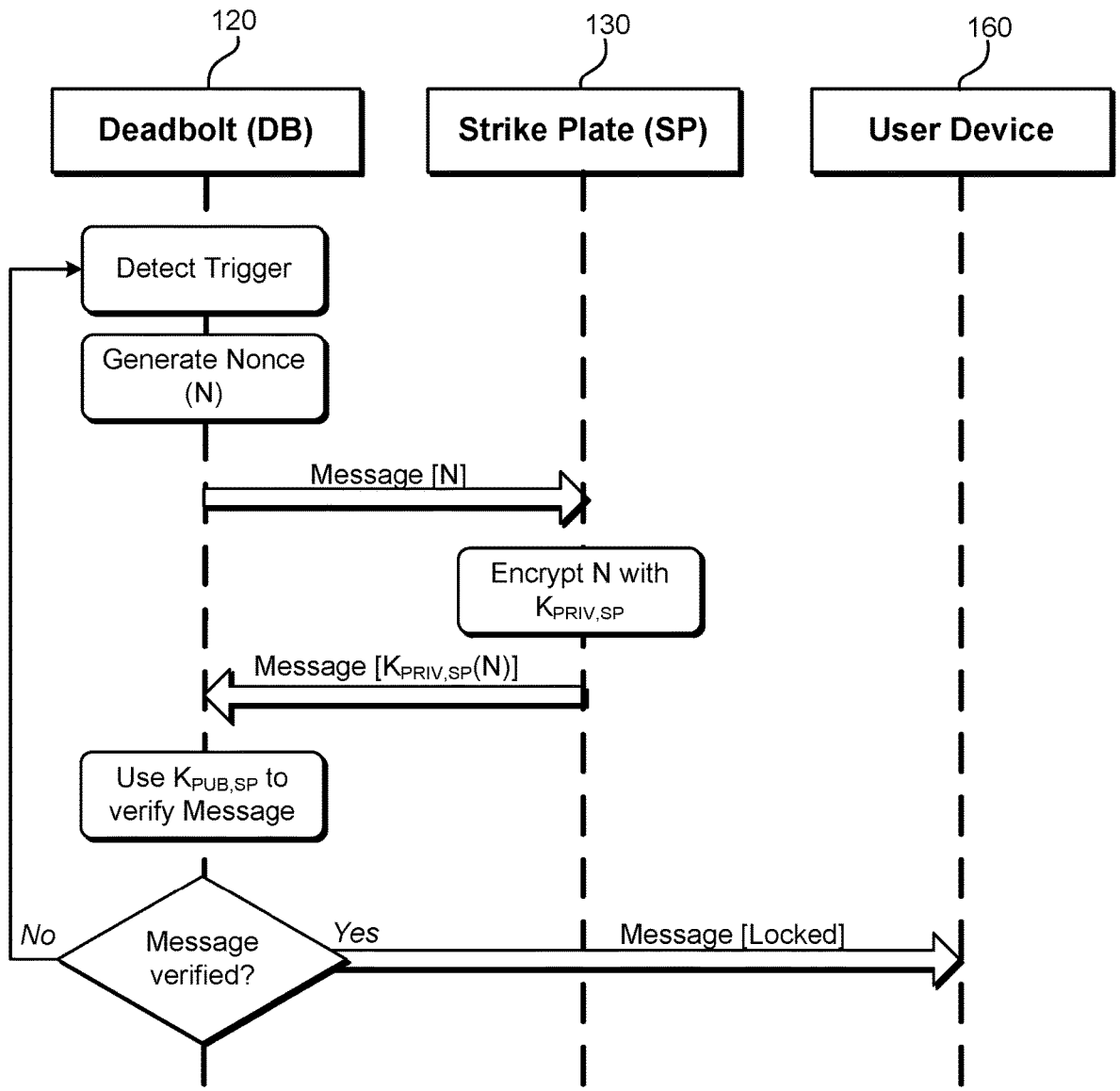
FIG. 4A illustrates an example sequence diagram for a network-enabled door lock in accordance with an embodiment.

FIG. 4A illustrates an example sequence diagram for a network-enabled door lock in accordance with an embodiment. The sequence of events illustrated in FIG. 4A can be performed by a network-enabled door lock system such as the embodiment of FIG. 3A. The deadbolt component 120 detects a "trigger." A trigger may be any event that initiates the execution of an authentication protocol between the deadbolt component 120 and the strike plate component 130. Examples of triggers include, but are not limited to the receipt of a request for a door status from a user device 160, a determination that a locking sequence has completed (including the completion of a manual locking of the deadbolt using a physical key or thumb turn), a security event (such as a detected hacking or replay attack), a passage of an amount of time after sensor-based or other detection of the door being closed (e.g., by the door engaging with a door jamb) or any other appropriate event that initiates execution of the authentication protocol.

As a result of the trigger being detected, in this example, the deadbolt component 120 generates a nonce, N. A nonce may be an arbitrary number that is used only once as a form of authentication in communications between two entities. A nonce may be a random or pseudorandom number issued by one entity in the communication and echoed back by the other entity (sometimes encrypted as part of a message response). Ideally, a nonce is used only once and/or has a limited duration, such that any attacker intercepting the nonce and attempting to use it in a "replay attack" will fail. Generally, a nonce is a value that is unpredictable to another entity (e.g., a nonce generated or otherwise obtained by the deadbolt is a value that is unpredictable by the strike plate), where predictability relative to an entity results from a lack of an ability of the entity to independently determine the nonce with information available to the entity. A nonce, in some implementations, is paired with or based on a sufficiently fine-grained timestamp, limiting its usefulness to a short period in time.

After generating the nonce, N, the deadbolt component 120 stores N (for later use in confirming the nonce) and transmits N to the strike plate component 130 in a message. The strike plate component 130 receives N, and encrypts N with its own private key, $K_{PRIV,SP}$. Alternatively or in addition to cryptographically verifying access to N through encryption, the strike plate component 130 may digitally sign N using its own private key or another key. Generally, any way of cryptographically proving access to a key by one component that another component is configured to trust is considered as being within the scope of the present disclosure. The strike plate component 130 then transmits the encrypted nonce, N, back to the deadbolt component 120. In embodiments where digital signatures are used, the strike plate 130 may transmit a digital signature of N to the deadbolt component 120. In such embodiments, when encryption is not used, the strike plate may not transmit N back since the deadbolt 120 has N stored.

The transmission of messages and other data described herein may be performed in various ways in accordance with various embodiments, such as using induction wireless, infrared wireless (such as technologies operating according to specifications and protocols provided by the Infrared Data Association, or IrDA) or ultra-wideband formats. In some embodiments, devices (such as strike plates and/or deadbolts) may utilize short-range, low-power and high-frequency radio transmissions, such as Bluetooth®. In still other embodiments, the first and second devices may support acoustic-based data transfer. For example, one device may include software components and a speaker that enable the second device to broadcast data to another as sound waves, while the other may include software components and microphone that enable the second device to receive the data embedded in the sound waves. Thus, one or more of radio signal-based data transfer (e.g., near field communication (NFC) or Bluetooth®), light-based data transfer (e.g., infrared data transfer), an acoustic-based data transfer (e.g., sound wave-embedded data), or magnetic field-based transfer (e.g., reading data from a magnetic stripe) may be used for inter-device communication. The protocols and components for enabling computing devices to perform the systems and methods of the present disclosure using such means for inter-device communication are well known to those skilled in the art of computer communications and thus, need not be described in more detail herein.

Deadbolt component 120 uses the public key, $K_{PUB,SP}$, corresponding to private key $K_{PRIV,SP}$ to decrypt the message to determine that the message, or a component of the message, matches the nonce, N, verifying the message. Note that the term "matches" can mean that the decrypted message contains a value that equals the nonce, N, but may also mean "matching" in other ways which also allow verification of the nonce value. For example, determining a match with the nonce, N, can be verifying a hash of the nonce is equal to a value contained in the message. Other variations of "matching" are within the scope of the disclosure.

The verification may also be done in a number of ways. For example, in addition to or as an alternative to decrypting the message to verify that the nonce, N, was returned, public key, $K_{PUB,SP}$, can be used to check a digital signature of the nonce, the key and nonce can be fed as inputs into an algorithm to determine if the result of the algorithm matches expected results, and the message may be checked to determine if it properly encodes a cryptographic binding between key and nonce.

If the message is verified, the deadbolt component 120 transmits a message to the user device 160, indicating the deadbolt component 120 and strike plate component 130 are mechanically engaged (that is, the door is "locked"). If the message is not verified, the deadbolt component 120 takes no action and returns to trying to detect a trigger. In an alternate embodiment, when the deadbolt component 120 is unable to verify the message, it may transmit a message indicating the door is "not locked," or that verification of the "locked" status failed. Other actions that may be taken include, but are not limited to, transmitting N or another nonce again to the strike plate to retry the process.

Figure 4B:
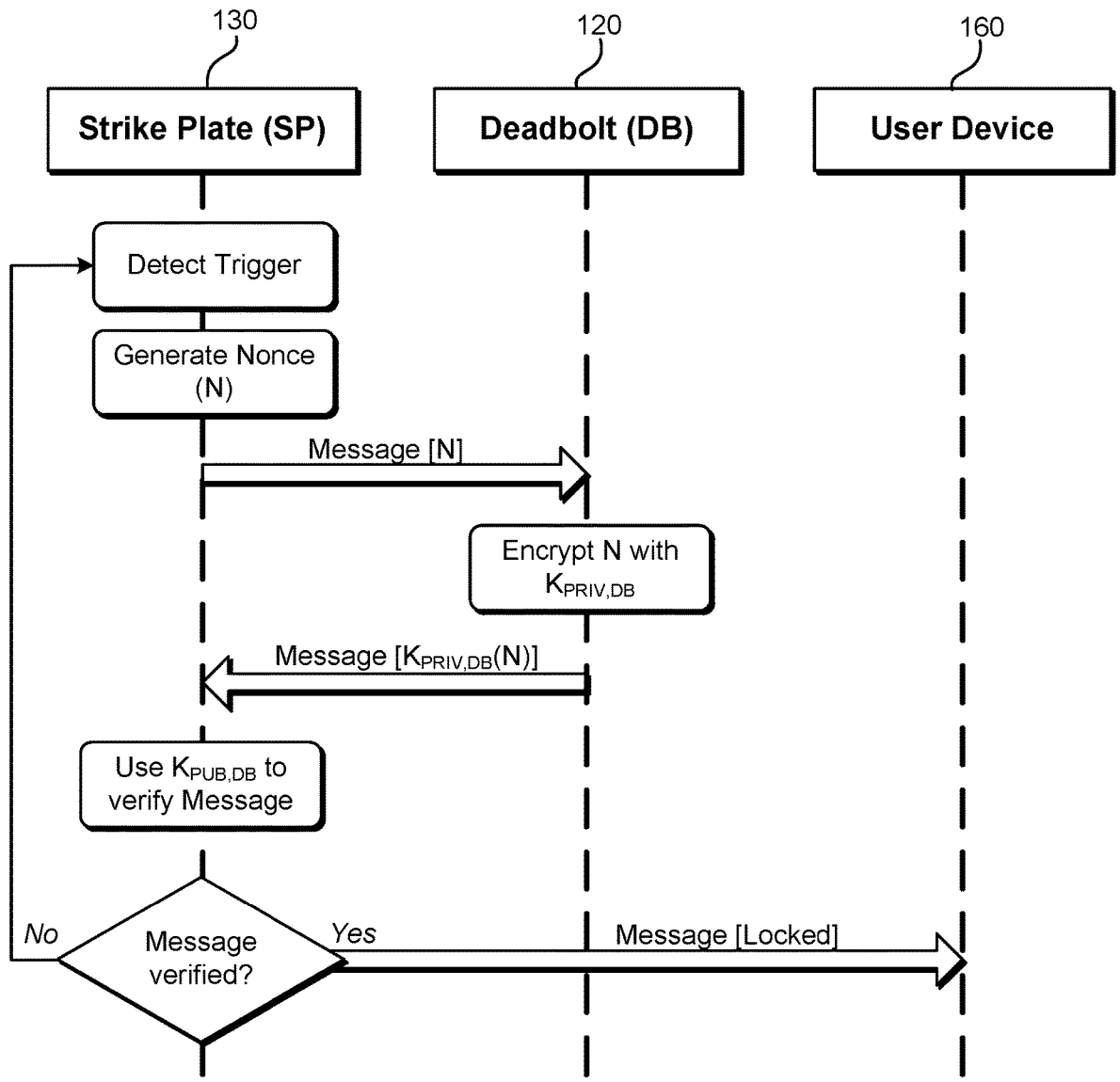
FIG. 4B illustrates an example sequence diagram for a network-enabled door lock in accordance with an embodiment.

FIG. 4B illustrates an example sequence diagram for a network-enabled door lock in accordance with an embodiment. This embodiment differs from FIG. 4A in that the roles of the deadbolt component 120 and strike plate component 130 are swapped. In this example, the strike plate component 130 detects the trigger and the authentication protocol between the strike plate component 130 and deadbolt component 120 is initiated.

Once the trigger is detected, the strike plate component 130 generates a nonce, N. After generating the nonce, N, the strike plate component 130 transmits N to the deadbolt component 120 in a message. The deadbolt component 120 receives N, and encrypts N with its own private key, $K_{PRIV,DB}$. The deadbolt component 120 then transmits the encrypted nonce, N, back to the strike plate component 130.

Upon receiving the message containing encrypted nonce N, the strike plate component 130 uses the public key, $K_{PUB,DB}$ corresponding to private key $K_{PRIV,DB}$ to decrypt the message to determine that nonce, N, was returned, verifying the message. If the message is verified, strike plate component 130 transmits a message to the user device 160, indicating the strike plate component 130 and deadbolt component 120 are mechanically engaged (that is, the door is "locked"). If the message is not verified, the strike plate component 130 takes no action and returns to trying to detect a trigger. In an alternate embodiment, when the strike plate component 130 is unable to verify the message, it may transmit a message indicating the door is "not locked," or that verification of the "locked" status failed.

Figure 4C:
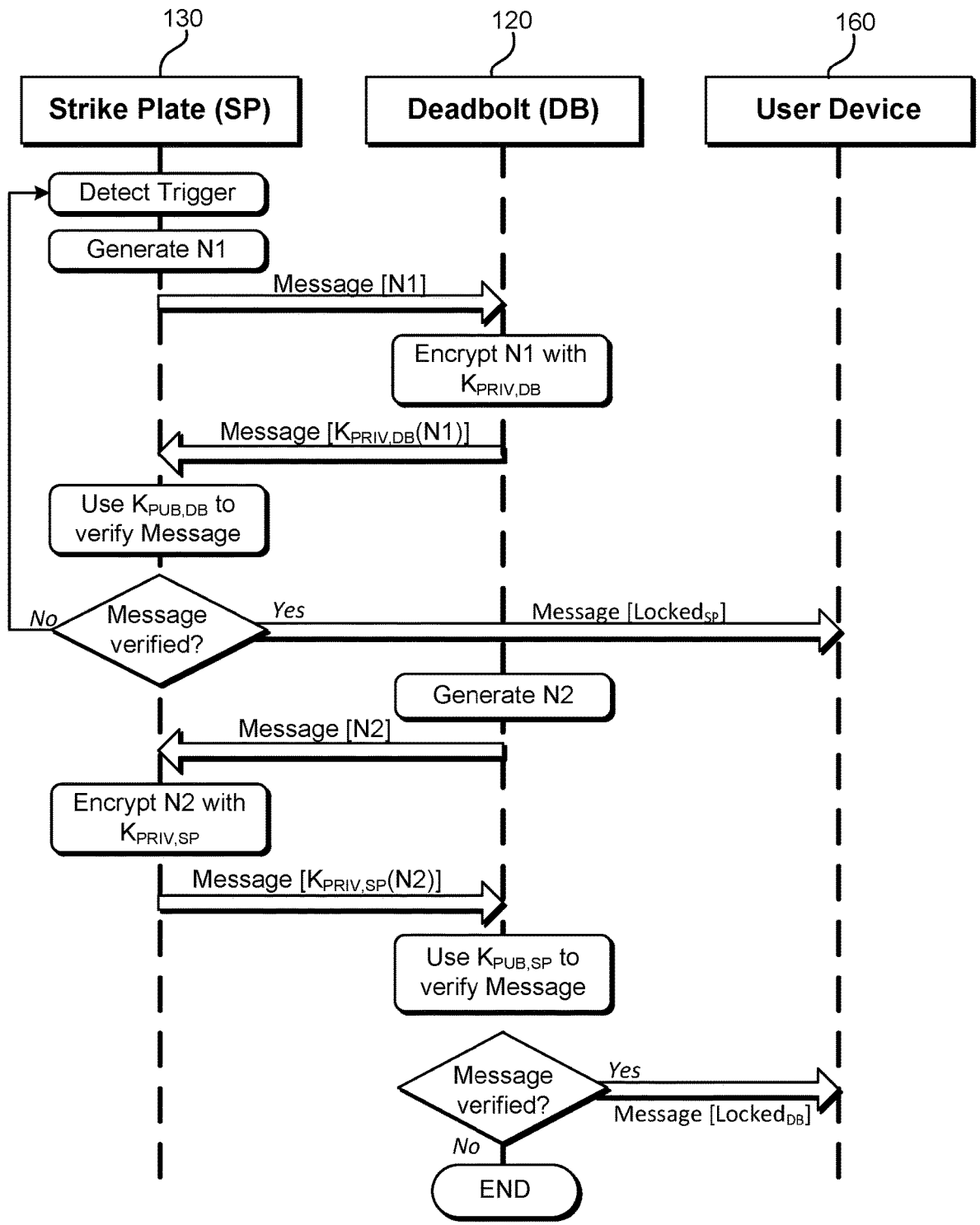
FIG. 4C illustrates an example sequence diagram for a network-enabled door lock in accordance with an embodiment.

FIG. 4C illustrates an example sequence diagram for a network-enabled door lock in accordance with an embodiment. The sequence of events illustrated in FIG. 4C can be performed by a network-enabled door lock system such as the embodiment of FIG. 3C, in which both the deadbolt component 120 and strike plate component 130 have their own private key. In this example embodiment, both the deadbolt component 120 and strike plate component 130 are operable to verify key and nonce-based messages from the other component, and both components will transmit a message to the user device 160 to indicate the door status.

The strike plate component 130 detects the trigger and the authentication protocol between the strike plate component 130 and deadbolt component 120 is initiated. Once the trigger is detected, the strike plate component 130 generates a first nonce, N1. After generating N1, the strike plate component 130 transmits N1 to the deadbolt component 120 in a message. The deadbolt component 120 receives N1, and encrypts it with its own private key, $K_{PRIV,DB}$. The deadbolt component 120 then transmits the encrypted nonce, N1, back to the strike plate component 130.

Upon receiving the message containing encrypted nonce N1, strike plate component 130 uses the public key, $K_{PUB,DB}$ corresponding to private key $K_{PRIV,DB}$ to decrypt the message to determine that nonce, N1, was returned, verifying the message. If the message is verified, strike plate component 130 transmits a message to the user device 160, indicating the strike plate component 130 and deadbolt component 120 are mechanically engaged (that is, the door is "locked"), at least from the point of view of the strike plate component 130. If the message is not verified, the strike plate component 130 takes no action and returns to trying to detect a trigger. In an alternate embodiment, when the strike plate component 130 is unable to verify the message, it may transmit a message indicating the door is "not locked," or that verification of the "locked" status failed.

After the deadbolt component 120 sends the encrypted N1 back to the strike plate component 130, the deadbolt component 120 will generate its own nonce, N2. The deadbolt component 120 then sends N2 to the strike plate component 130 in a message. Upon receipt of the message, the strike plate component 130 encrypts N2 with its own private key, $K_{PRIV,SP}$. The encrypted nonce, N2, is then transmitted back to the deadbolt component 120.

Upon receiving the message containing encrypted nonce N2, deadbolt component 120 uses the public key, $K_{PUB,SP}$ corresponding to private key $K_{PRIV,SP}$ to decrypt the message to determine that nonce, N2, was returned, verifying the message. If the message is verified, deadbolt component 120 transmits a second message to the user device 160, indicating the strike plate component 130 and deadbolt component 120 are mechanically engaged (that is, the door is "locked"), at least from the point of view of the deadbolt component 120. If the message is not verified, execution ends.

It should be appreciated that alternate embodiments may have numerous variations from that described above in FIG. 4C. For example, the roles of the strike plate component 130 and the deadbolt component 120 can be reversed, with the deadbolt component 120 detecting the initial trigger. As another example, both the strike place component 130 and the deadbolt component 120 may attempt to detect the trigger event. That is, instead of waiting to receive N1 from the strike plate component 130 before generating N2, the deadbolt component 120 can detect the trigger independently (and/or detect another trigger) and generate N2 based on the detection of the trigger. In other words, some actions performed by the strike plate may be performed independently of (e.g., asynchronous to) actions performed by the deadbolt, and vice versa. The user device may therefore receive the "locked" messages from the strike plate component 130 and the deadbolt component 120 in any order. Other variations are within the spirit of the present disclosure.

Figure 4D:
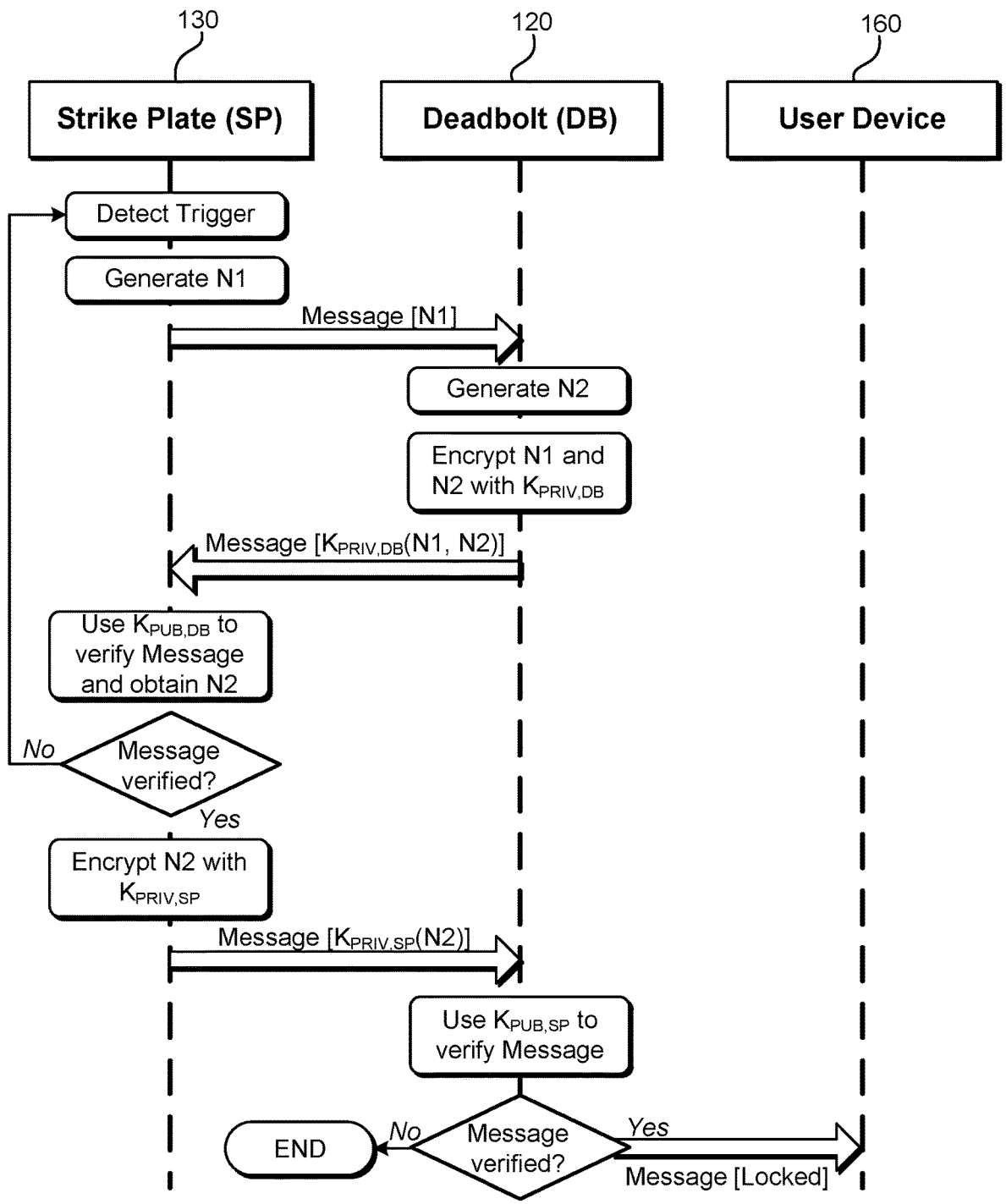
FIG. 4D illustrates an example sequence diagram for a network-enabled door lock in accordance with an embodiment.

FIG. 4D illustrates an example sequence diagram for a network-enabled door lock in accordance with an embodiment. As with FIG. 4C, the sequence of events illustrated in FIG. 4D can be performed by a network-enabled door lock system such as the embodiment of FIG. 3C, in which both the deadbolt component 120 and strike plate component 130 have their own private key. In this example embodiment, both the deadbolt component 120 and strike plate component 130 must verify key and nonce-based messages from the other component, but only one component will transmit a message to the user device 160 to indicate the door status.

The strike plate component 130 detects the trigger and the authentication protocol between the strike plate component 130 and deadbolt component 120 is initiated. Once the trigger is detected, the strike plate component 130 generates a first nonce, N1. After generating N1, the strike plate component 130 transmits N1 to the deadbolt component 120 in a message. The deadbolt component 120 receives N1, and in response, generates a second nonce, N2. The deadbolt component 120 then encrypts both N1 and N2 with its own private key, and transmits a message containing encrypted N1 and N2 to the strike plate component 130.

Upon receiving the message containing encrypted nonces N1 and N2, strike plate component 130 uses the public key, $K_{PUB,DB}$ corresponding to private key $K_{PRIV,DB}$ to decrypt the message to determine that nonce, N1, was indeed returned, verifying the message, and to obtain N2. If the message is verified, then strike plate component 130 encrypts N2 with its private key, $K_{PRIV,SP}$ and sends the encrypted N2 in a message to the deadbolt component 120.

Upon receiving the message containing encrypted nonce N2, deadbolt component 120 uses the public key, $K_{PUB,SP}$ corresponding to private key $K_{PRIV,SP}$ to decrypt the message to determine that N2 was returned, verifying the message. If the message was verified, the deadbolt component 120 transmits a message to the user device 160 indicating the door is "locked."

It should be appreciated that alternate embodiments may have numerous variations from that described above in FIG. 4D. For example, the roles of the strike plate component 130 and the deadbolt component 120 can be reversed, with the deadbolt component 120 detecting the initial trigger. Also, although the examples of FIGS. 4A-4D describe the use of asymmetric keys, other variations, including variations where a symmetric key is shared between the two lock components can be used to encrypt and/or digitally sign the nonce and/or other sensitive data. Additional detail regarding various cryptographic algorithms is discussed below in regard to FIG. 6. Other variations are within the spirit of the present disclosure.

Figure 5A:
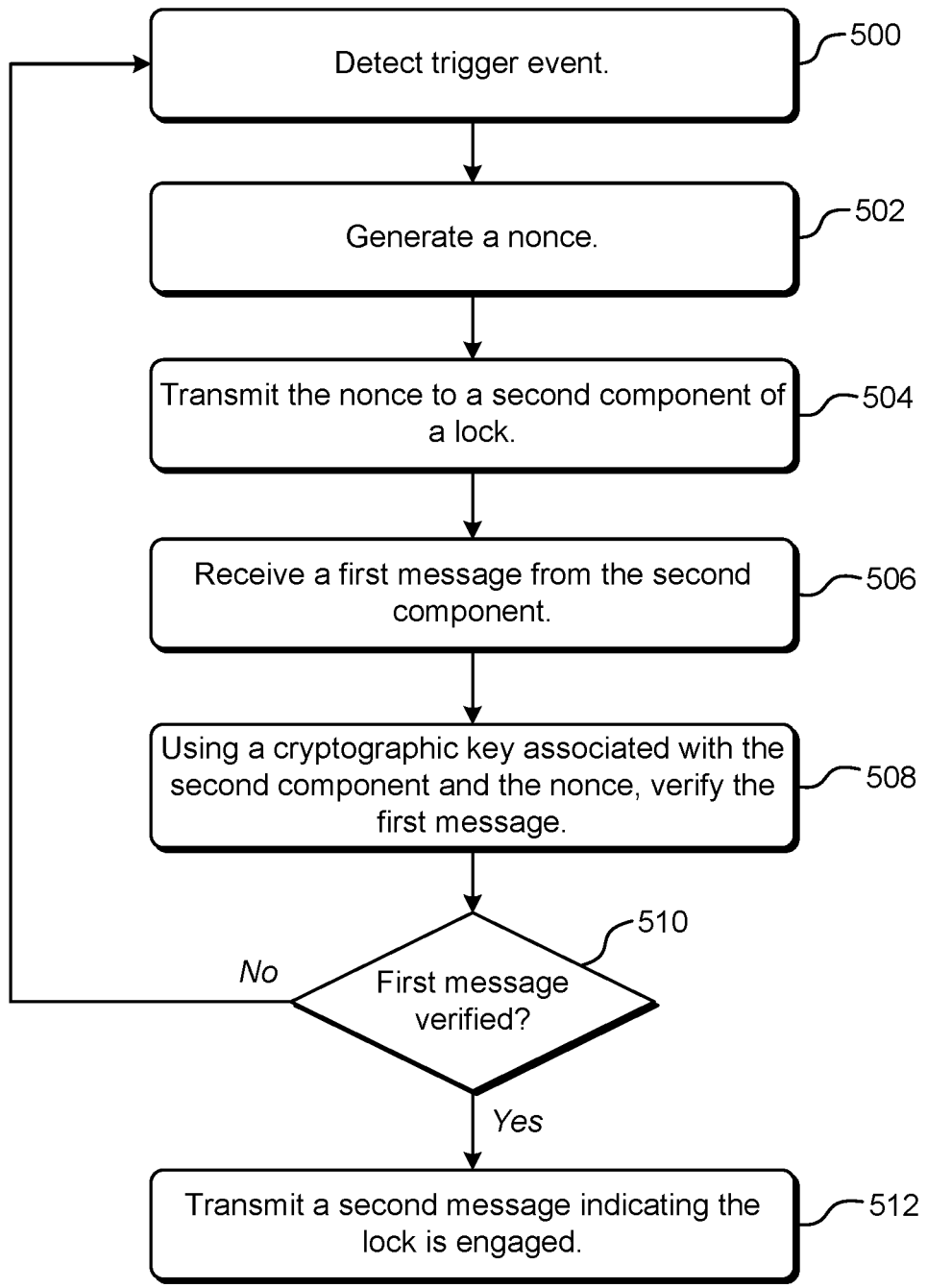
FIG. 5A illustrates an example flowchart for a network-enabled door lock in accordance with an embodiment.

FIG. 5A illustrates an example flowchart for a network-enabled door lock in accordance with an embodiment. The flowchart of FIG. 5A is executed by a first component of the network-enabled door lock, such as the deadbolt component 120 or the strike plate component 130, or both. For example, the deadbolt component 120 may serve as a first component executing the flowchart of FIG. 5A, and communicate with a "second component," the strike plate component 130. In another example, the strike plate component 130 may serve as the first component executing the flowchart of FIG. 5A, and communicate with second component, the deadbolt component 120.

In an embodiment, a first component operates according to logic (i.e., uses software and/or hardware-encoded instructions) to perform the steps of FIG. 5A. The first component detects a trigger event at Step 500. As previously described herein, examples of triggers may include, but are not limited to, the receipt of a request for a door status from a user device 160, a determination that a locking sequence has completed (including the completion of a manual locking of the door lock using a physical key or thumb turn), a security event (such as a detected hacking or replay attack), or any other appropriate event that necessitates authentication.

Upon detecting the trigger, the first component generates a nonce at Step 502, and transmits the nonce to the second component of the door lock at Step 504. The first component then receives a first message from the second component at Step 506. The message received from the second component will be encrypted using a private key associated with the second component. Therefore, the first component of the door lock must use a public key corresponding to the private key associated with the second component and the nonce to verify the first message (Step 508). Verification of the first message comprises at least decrypting the message to obtain the nonce value returned from the second component and comparing it to the nonce value that was originally sent out to the second component. If the two nonce values match, the message is verified.

If the message is verified (Step 510), the first component then transmits a second message indicating that the door is locked (Step 512). If the message is not verified, then the first component returns to Step 500 to detect a new trigger event.

While FIG. 5A (and, similarly, FIGS. 5B and 5C) illustrate a typical exchange between components of a network-based lock system, these steps are not intended to be limiting, and numerous variations may exist. For example, various communication errors may be encountered during the execution of the steps shown. In one example, a message sent from one lock component to the other lock component may not be received, even though the content of the transmitted message is valid (e.g., a battery of the deadbolt component may fail before a message is received or transmitted). In another example, the initial setup of a communications session between lock components may fail for a variety of reasons (e.g., an error during a key exchange.) Other variations are within the spirit of the present disclosure.

Figure 5B:
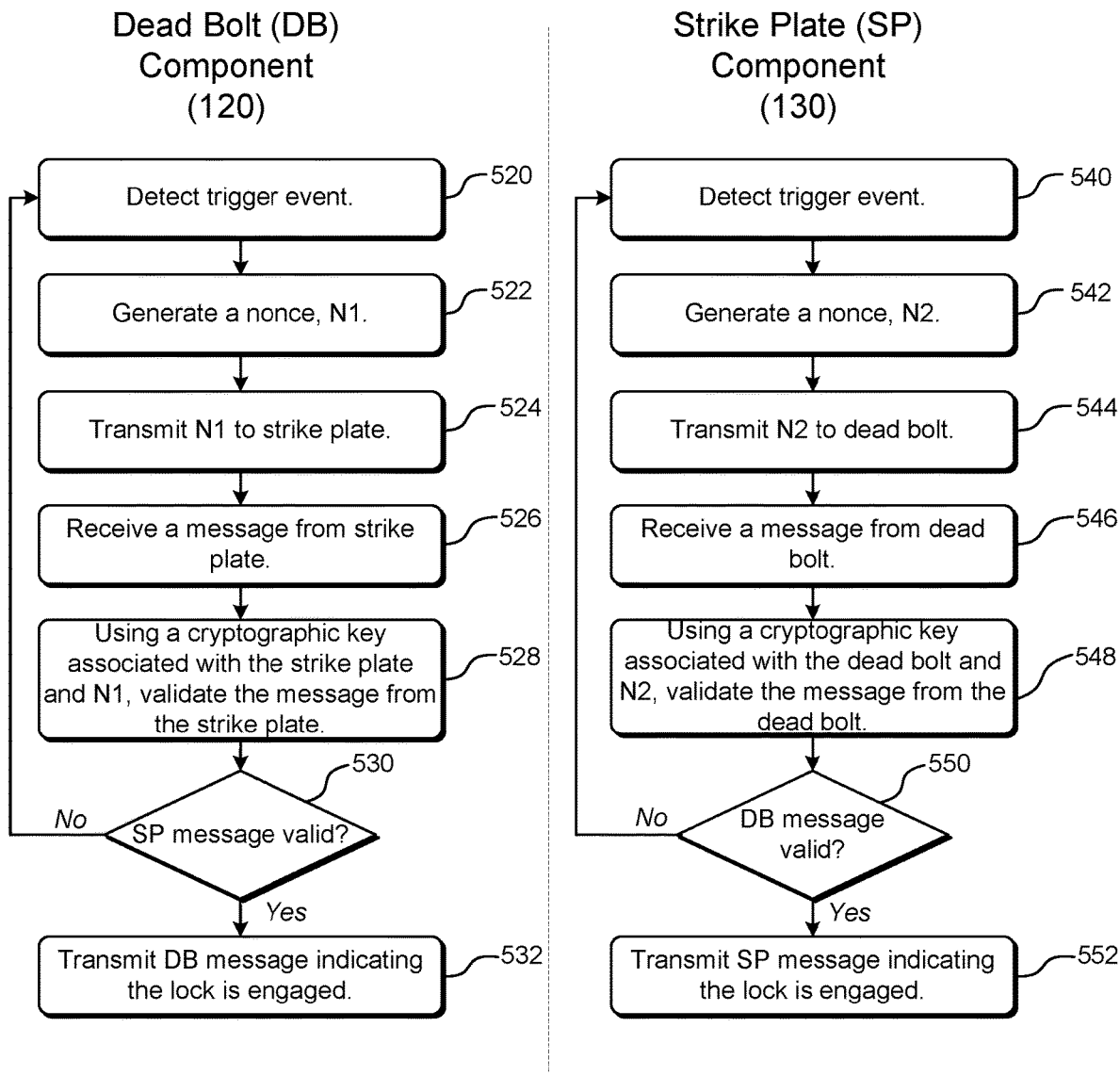
FIG. 5B illustrates an example flowchart for a network-enabled door lock in accordance with an embodiment.

FIG. 5B illustrates an example flowchart for a network-enabled door lock in accordance with an embodiment. The flowchart of FIG. 5B may be executed by a network-enabled door lock such as that of FIG. 3C, in which both the deadbolt component 120 and strike plate component 130 have private keys. In this example embodiment, both the deadbolt component 120 and strike plate component 130 must transmit a door status of "locked" before the status will be assumed to be valid.

Starting with the deadbolt component 120, the deadbolt component 120 detects a trigger event at Step 520. It should be noted that, in addition to the types of triggers previously discussed herein, a trigger in this example embodiment may also include a message from the strike plate component 130.

Upon detecting the trigger, the deadbolt component 120 generates nonce N1 at Step 522, and transmits the nonce to the strike plate component 130 at Step 524. The deadbolt component 120 then receives a message from the strike plate component 130 at Step 526. The message received from the strike plate component 130 will be encrypted using a private key associated with the strike plate component 130. Therefore, the deadbolt component 120 must use a public key corresponding to the private key associated with the strike plate component 130 and nonce N1 to verify the message (Step 528). Verification of the strike plate message comprises at least decrypting the message to obtain the nonce value returned from the strike plate component 130 and comparing it to the N1 value that was originally sent out to the strike plate component 130. If the two nonce values match, the message is verified.

If the message is verified (Step 530), the deadbolt component 120 then transmits a message indicating that the door is locked (Step 532), at least from the point of view of the deadbolt component 120. If the message is not verified, then the deadbolt component 120 returns to Step 520 to wait for a new trigger event.

Turning to the flowchart associated with the strike plate component 130, the strike plate component 130 detects a trigger event at Step 540. It should be noted that, in addition to the types of triggers previously discussed herein, a trigger in this example embodiment may also include a message from the deadbolt component 120.

Upon detecting the trigger, the strike plate component 130 generates nonce N2 at Step 542, and transmits the nonce to the deadbolt component 120 at Step 544. The strike plate component 130 then receives a message from the deadbolt component 120 at Step 546. The message received from the deadbolt component 120 will be encrypted using a private key associated with the deadbolt component 120. Therefore, the strike plate component 130 must use a public key corresponding to the private key associated with the deadbolt component 120 and nonce N2 to verify the message (Step 548). Verification of the deadbolt message comprises at least decrypting the message to obtain the nonce value returned from the deadbolt component 120 and comparing it to the N2 value that was originally sent out to the deadbolt component 120. If the two nonce values match, the message is verified.

If the message is verified (Step 550), the strike plate component 130 then transmits a message indicating that the door is locked (Step 552), at least from the point of view of the strike plate component 130. If the message is not verified, then the strike plate component 130 returns to Step 540 to wait for a new trigger event.

Figure 5C:
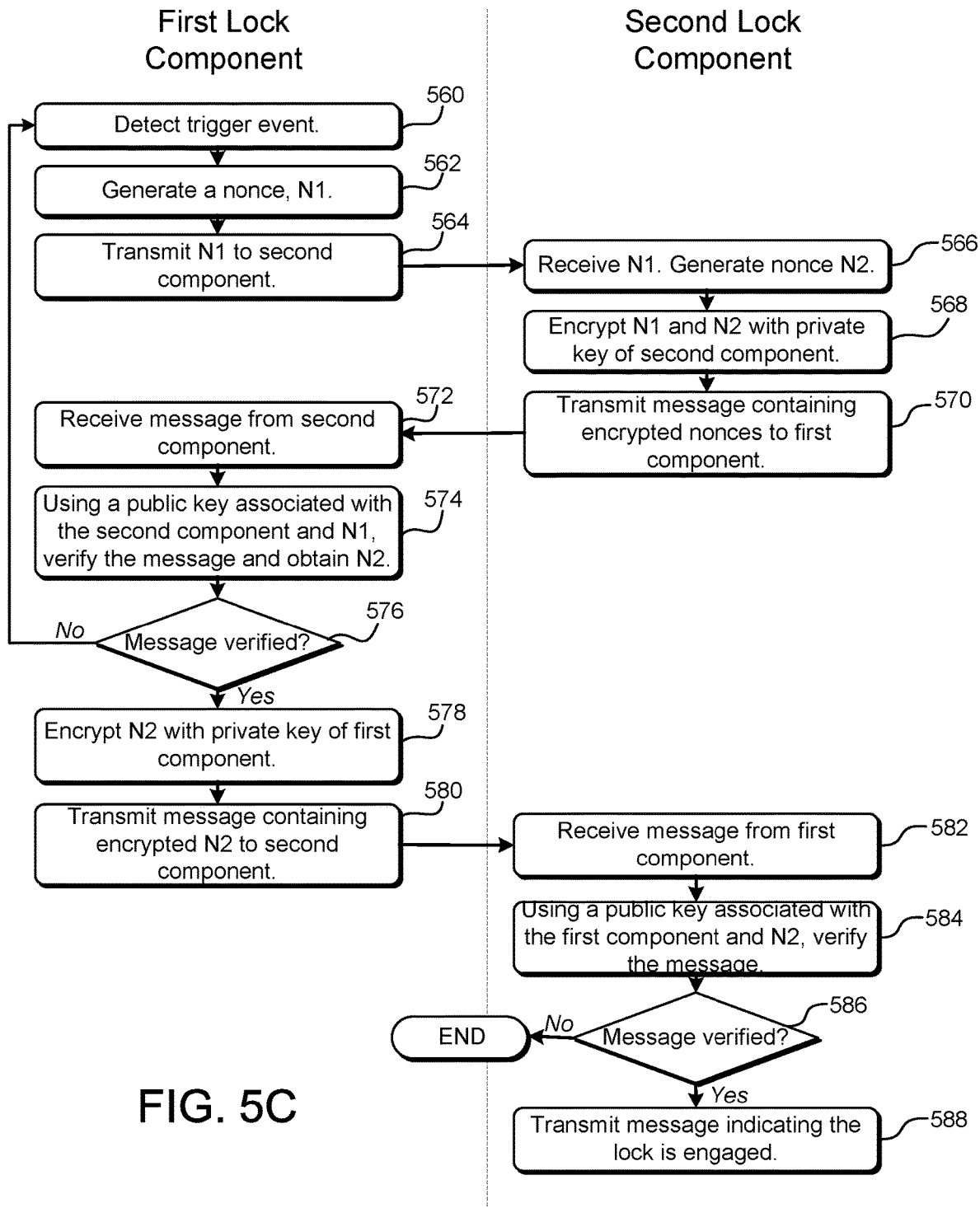
FIG. 5C illustrates an example flowchart for a network-enabled door lock in accordance with an embodiment.

FIG. 5C illustrates an example flowchart for a network-enabled door lock in accordance with an embodiment. As with FIG. 5B, the flowchart of FIG. 5C may be executed by a network-enabled door lock such as that of FIG. 3C, in which both the deadbolt component 120 and strike plate component 130 have private keys. In this example embodiment, both the deadbolt component 120 and strike plate component 130 must cryptographically verify messages received from the other component before for the network-enabled door lock is assumed to be locked.

The flowchart of FIG. 5C is executed by a network-enabled door lock system comprising a first lock component and a second lock component. As discussed herein, in an embodiment, these components are the deadbolt component 120 and the strike plate component 130. However, as the roles of these two components is interchangeable in regard to the execution of the flowchart of FIG. 5C, the steps of FIG. 5C are divided into those performed by a "first lock component" and a "second lock component."

The first lock component detects a trigger event at Step 560, and generates nonce, N1, in response at Step 562. The first lock component then transmits N1 to the second lock component in a message at Step 564.

The second lock component receives the message containing N1 and generates a second nonce, N2, at Step 566. The second lock component then encrypts both N1 (received from the first lock component) and N2 at Step 568. The second lock component transmits a message containing the encrypted nonces, N1 and N2, to the first lock component at Step 570.

The first lock component receives the message containing the encrypted N1 and N2 at Step 572. The first lock component uses a public key associated with the second lock component and the value of N1 it previously transmitted to decrypt the message, verify that N1 was returned, and obtain N2 (Step 574). If the message is not verified (Step 576), the first lock component returns to Step 560 to wait for a new trigger event. If the message is verified, the first lock component then encrypts N2 with its own private key (Step 578) and transmits a message containing encrypted N2 back to the second component (Step 580).

The second lock component receives the message containing encrypted N2 from the first component at Step 582. The second lock component uses a public key associated with the first lock component and the value of N2 it previously transmitted to decrypt the message, verify that N2 was returned, and verify the message (Step 584). If the message is not verified (Step 586), the second lock component ends processing. If the message is verified, the second lock component then transmits a message indicating the door is locked (Step 588).

Figure 6:
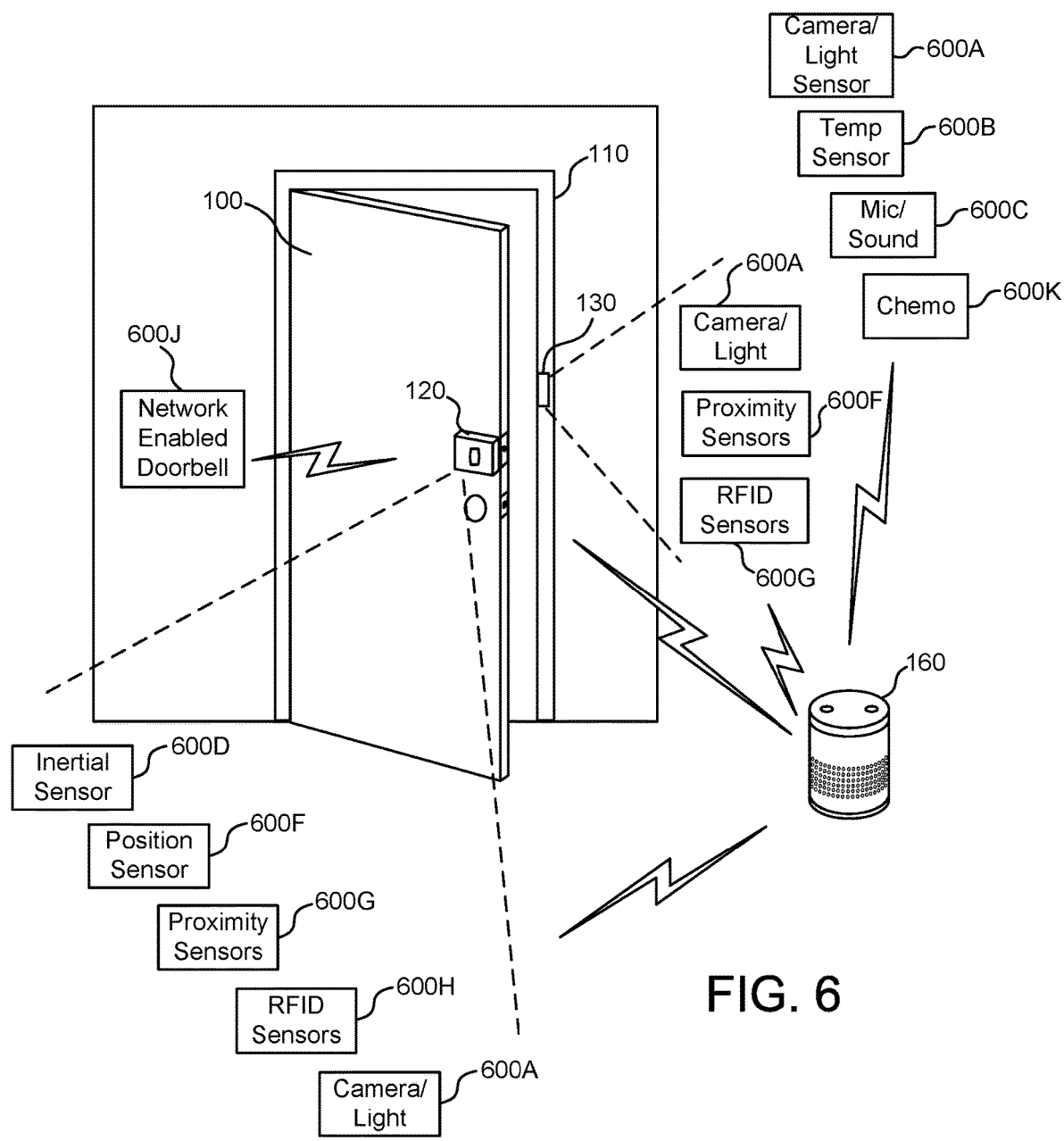
FIG. 6 illustrates an example environment for a network-enabled door lock in accordance with an embodiment.

FIG. 6 illustrates an example environment for a network-enabled door lock in accordance with an embodiment. In the embodiment shown in FIG. 6, a network-enabled door lock comprising a deadbolt component 120 mounted on a door 100, and a strike plate component 130 mounted on or near a door jamb 110, interacts with a user device 160 and one or more sensors 600. It should be noted that the reference designator 600 shall be used to broadly represent any sensors in communication with the network-enabled door lock system, and that the term "sensor" shall include any network-enabled devices with sensing capabilities (in other words, any device used primarily as a sensing device shall be labeled 600). It should also be noted that the reference designator 600 shall be paired with a single letter (for example, 600A) in some cases in order to differentiate between different types of sensors.

In various embodiments, data objects such as nonces are made to be cryptographically verifiable. In one example, cryptographically verifiable data objects are created to be cryptographically verifiable by the system to which the data object is to be provided or another system that operates in conjunction with the system to which the data object is to be provided. For example, as noted above, the data object may be encrypted so as to be decryptable by the system that will cryptographically verify the data object, where the ability to decrypt the data object serves as cryptographic verification of the data object. As another example, the data object may be digitally signed (thereby producing a digital signature of the data object) such that the digital signature is verifiable by the system that will cryptographically verify the data object. In other examples, both encryption and digital signatures are used for cryptographic verifiability and/or security.

The key used to encrypt and/or digitally sign the data object may vary in accordance with various embodiments and the same key is not necessarily used for both encryption and digital signing, where applicable. In some embodiments, a key used to encrypt the data object is a public key of a public/private key pair where the private key of the key pair is maintained securely by the system to which the data object is to be provided, thereby enabling the system to decrypt the data object using the private key of the key pair. Using the public key to encrypt the data object may include generating a symmetric key, using the symmetric key to encrypt the data object, and encrypting the symmetric key using the public key, where the encrypted symmetric key is provided to a system with the encrypted data object to enable the system to use the corresponding private key to decrypt the symmetric key and use the decrypted symmetric key to decrypt the data object. Further, in some embodiments, the data object is digitally signed using a private key of a public/private key pair corresponding to the computer system that encrypts and/or digitally signs the data object (e.g., a user device). Other variations, including variations where a symmetric key is shared between the two entities can be used to encrypt and/or digitally sign the data object.

As discussed, numerous variations utilize symmetric and/or asymmetric cryptographic primitives. Symmetric key algorithms may include various schemes for performing cryptographic operations on data including block ciphers, stream ciphers and digital signature schemes. Example symmetric key algorithms include the advanced encryption standard (AES), the data encryption standard (DES), triple DES (3DES), Serpent, Twofish, blowfish, CASTS, RC4 and the international data encryption algorithm (IDEA). Symmetric key algorithms may also include those used to generate output of one way functions and include algorithms that utilize hash-based message authentication codes (HMACs), message authentication codes (MACs) in general, PBKDF2 and Bcrypt. Asymmetric key algorithms may also include various schemes for performing cryptographic operations on data. Example algorithms include those that utilize the Diffie-Hellman key exchange protocol, the digital signature standard (DSS), the digital signature algorithm, the ElGamal algorithm, various elliptic curve algorithms, password-authenticated key agreement techniques, the pallier cryptosystem, the RSA encryption algorithm (PKCS #1), the Cramer-Shoup cryptosystem, the YAK authenticated key agreement protocol, the NTRUEncrypt cryptosystem, the McEliece cryptosystem, and others. Elliptic curve algorithms include the elliptic curve Diffie-Hellman (ECDH) key agreement scheme, the Elliptic Curve Integrated Encryption Scheme (ECIES), the Elliptic Curve Digital Signature Algorithm (ECDSA), the ECMQV key agreement scheme and the ECQV implicit certificate scheme. Other algorithms and combinations of algorithms are also considered as being within the scope of the present disclosure and the above is not intended to be an exhaustive list.

Returning to FIG. 6, a network-enabled door lock may be in communication with a user device 160 and one or more sensors 600. In an embodiment, the user device 160 gathers information from the sensors 600 and the deadbolt component 120 and/or strike plate component 130 to determine whether the door is locked (i.e., whether the deadbolt component 120 is mechanically engaged with the strike plate component 130). The user device 160 may use information gathered from sensors 600, the deadbolt component 120, and the strike plate component 130 to calculate a confidence factor, wherein the confidence factor represents a likelihood that the door is actually locked. Based on this confidence factor, the user device 160 may notify a user (not shown) that the door is either locked or unlocked.

Some of these sensors 600 may be integral or mounted in proximity to the deadbolt component 120. As the deadbolt component 120 may be mounted on the door 100, the deadbolt component 120 is subject to move as the door 100 is moved. Because of this, inertial sensors 600D may be used to measure the magnitude of movement of the deadbolt component 120 as it swings away from and toward the strike plate component 130. Inertial sensors 600D may include, but are not limited to, accelerometers, which can be used to measure a change in velocity (an acceleration) in one or more axes of movement, and gyroscopes, which can measure an orientation in three-dimensional space. Position sensors 600F may be used to measure the position of the deadbolt component 120 relative to the position of the strike plate component 130. Position sensors 600F may measure an absolute position in space or they may measure a position relative to a second object. Position sensors 600F may include, but are not limited to, global navigation satellite sensor (GNSS) receivers, capacitive sensors, optical ranging sensors, linear encoders, rotary encoders, and tactile sensors (such as a wheel or momentary switch on an edge of the door to sense movement or contact with the floor or door jamb). Proximity sensors 600G may also be used to determine relative position in relation to another component by sensing the proximity of the other component. Proximity sensors 600G may include, but are not limited to, a mechanical switch or actuator, capacitive sensors, Hall effect sensors, Doppler effect sensors, inductive sensors, magnetic sensors, optical sensors, and reflected wave sensors (such as radar and laser rangefinder). Radio frequency identification (RFID) sensors 600H may also be used, in concert with matching RFID sensors 600H in or near the strike plate component. For example, an RFID reader may be embedded in or near the deadbolt component 120, and an RFID tag may be embedded in or near the strike plate component 130, such that an electromagnetic field of the RFID reader energizes a circuit in the RFID tag when the two components come in proximity. In an alternate embodiment, the RFID reader may be associated with the strike plate component 130, and the RFID tag may be associated with the deadbolt component 120. Camera and/or light sensors 600A may be used by the deadbolt component 120 to sense ambient light conditions, or to visually detect the position of other components (such as the latch hole of the strike plate component 130) or fiducial marks on those components to determine a relative position relative to those components.

Sensors integral to or mounted near the strike plate component 130 may include, but not be limited to, proximity sensors 600G and RFID sensors 600H. As the strike plate component 130 is typically stationary (as it is mounted to stationary door jamb 110), it is less likely to use inertial sensors 600D or position sensors 600F. However, in an embodiment, one or more features of the strike place component 130 may be able to move, making the use of these types of sensors appropriate. The strike plate component 130 may also use camera and/or light sensors 600A to sense ambient light conditions, or to visually detect the position of other components (such as the position of the physical deadbolt relative to the strike plate component 130) or fiducial marks on those components to determine a relative position relative to those components.

Other types of sensors located remotely from either the deadbolt component 120 or the strike plate component 130 may be used to provide information on the status of the door and network-enabled door lock. For example, information from a camera or light sensor 600A mounted remotely such that it has a line of sight to the door may be analyzed to determine the door position. One or more temperature sensors 600B may be used to measure temperature near a door. This temperature data may be used to compare the temperature sensed near a door to an expected temperature, such as an average temperature detected inside the house or an external temperature outside the house, to see if an open door is causing a shift in the expected temperature. A microphone, audio sensor, or vibration sensor 600C may be used to detect a shift in the ambient noise level near a door, perhaps caused by outdoor noises (for example, street sounds) not normally present when the door is closed. A chemoreceptor 600K (or chemosensor, such as an "electronic nose") may be used to detect the presence of or a change in trace amounts of chemical agents in the air, which may be indicative of an exchange of air through an open door. Other network-enabled devices, such as a network-enabled doorbell 600J (such as the Blink Video Doorbell System manufactured by Blink, or the Video Doorbell manufactured by Ring, Inc.), may be used to provide information useful in determining a door status. In an embodiment, messages received from doorbell 600J may be used in a triangulation algorithm to determine a position of the deadbolt component 120. The doorbell 600J may itself have integral sensors (for example, a camera, a microphone, etc.) that may be used to provide information about the environment to help determine the status of the door.

It should be appreciated that alternate embodiments may have numerous variations from that described above in FIG. 6. For example, the sensors 600 shown in FIG. 6 as integral to either the deadbolt component 120 or the strike plate component 130 may be mounted elsewhere, such as on the door 100, door jamb 110, or on the wall near the door 100. For example, a rotary encoder (a type of proximity or position sensor) could be mounted on a hinge of door 100 such that the value seen by the encoder varies with the changing door position. In addition, other sensor types and network-enabled devices not discussed here may be used. Other variations are within the spirit of the present disclosure.

Figure 7:
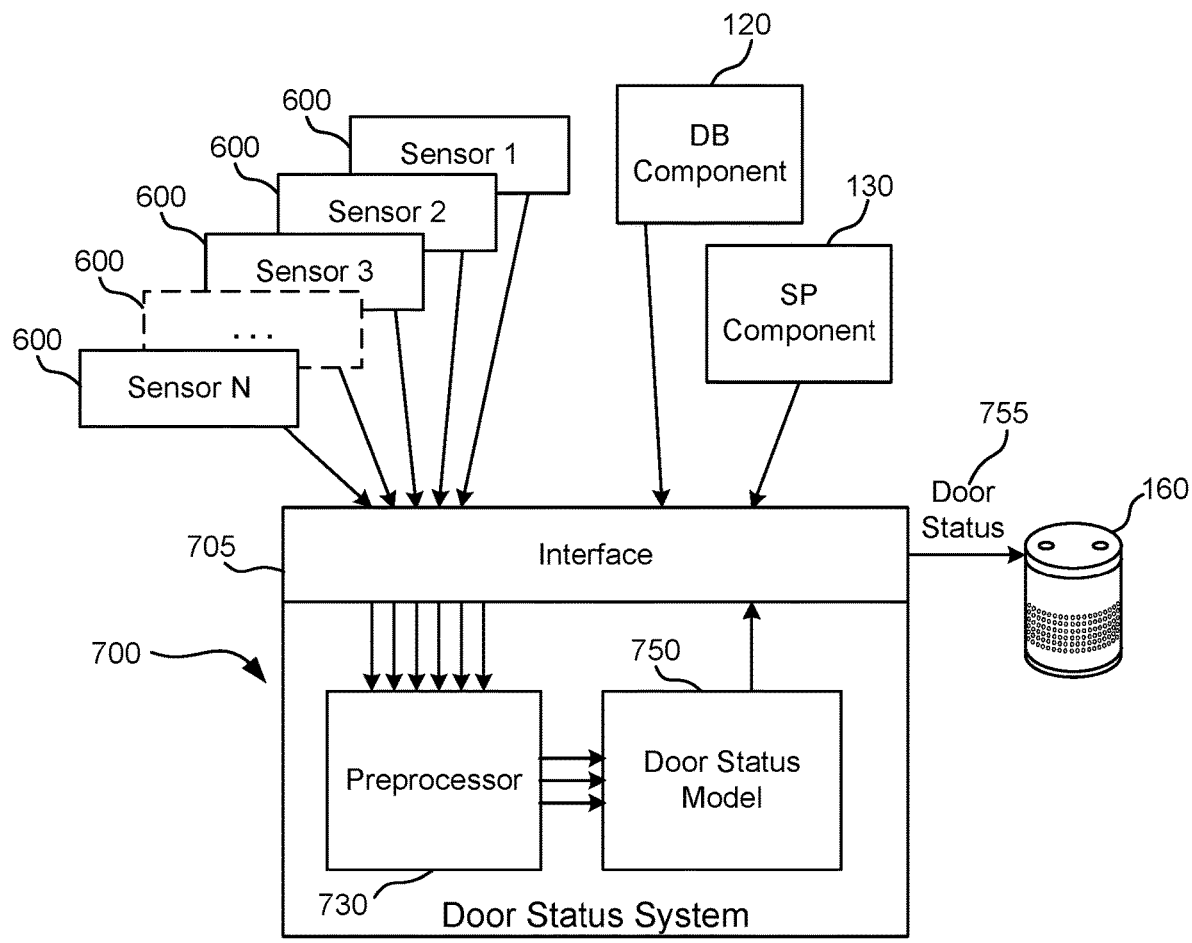
FIG. 7 illustrates an example context diagram for a door status system in accordance with an embodiment.

FIG. 7 illustrates an example context diagram for a door status system in accordance with an embodiment. The door status system 700 gathers data from one or more sensors 600 (which may include network-enabled devices uses with sensing capabilities), as well as from the deadbolt component 120 and the strike plate component 130. For example, network-enabled devices which may provide data to the door status system 700 may include, for example, network-enabled doorbells, personal digital assistants, consumer devices, IoT devices, portable electronic devices, and mobile phones, or any other appropriate network-enabled devices.

An interface 705 of the door status system 700 receives the data from the sensors 600 and deadbolt component 120 and strike plate component 130 and forwards them to a preprocessor 730, which prepares and formats the data for consistency. In an embodiment, the preprocessor receives sensor data and, from the sensor data, generates a set of inputs for application of a model (e.g., a machine-learning model). Preprocessing may include operations such as normalizing some or all of the data, summarizing sensor readings (e.g., averaging over a time period or otherwise converting multiple readings into a statistical value) and/or otherwise generating inputs for the model. The exact manner of how the preprocessor operations will vary in accordance with the specific model used in various embodiments. As an illustrative example, input to the model may be a vector of values, where each value corresponds to the state of a sensor (or set of sensors). The preprocessor may determine the values for the vector to be input into the model, such as by converting values to use other units of measurements, by changing data types (e.g., by changing strings and/or Boolean values into numerical values (e.g., 0 or 1)), and otherwise generating the inputs for the model. The preprocessor may operate according to a set of rules that indicate if and/or how each type of data that it is received is to be used in the generation of input for the model.

In one embodiment, the data received from deadbolt component 120 and/or strike plate component 130 is one or more messages indicating the success or failure of the steps illustrated in the sequence diagrams of FIGS. 4A-4D, or similar use case scenarios. For example, the data may be a message from the deadbolt component 120 (or, alternately, the strike plate component 130) indicating a door status of "LOCKED" As another example, the data may be a message from the deadbolt component 120 with a status of "LOCKED," paired with a message from the strike plate 130 with a door status of "NOT LOCKED" (when the two components disagree on the status of the lock). In this example, these potentially conflicting messages are taken in by the preprocessor 730 and included in the generated set of inputs to the door status model 750, rather than being the only information used to determine the status of the door and door lock.

The data is forwarded from the preprocessor 730 to be input into a door status model 750, which uses the gathered and preprocessed data to determine a door status 755, which is transmitted via the interface 705 to a user device 160.

Although a physical user device 160 is shown in FIG. 7 for illustration purposes, it should be noted that the door status 755 may be transmitted or otherwise delivered to any appropriate destination associated with the door. For example, in an embodiment, a message containing door status 755 may be transmitted to an IP address of a user associated with the door (for example, an account of a person living in the house). In an embodiment, the door status 755 may be delivered to a user device, a personal digital assistant, an IoT hub, an IoT device, a third-party service provider, or any other appropriate destination. In an embodiment, the door status 755 may be transmitted to multiple destinations (for example, multiple IP addresses associated with an owner of a group of users who jointly own and/or operate the lock, multiple devices owned by a single user, etc.).

The door status system 700 may be embedded in and executed by a user device such as a mobile device, a personal digital assistant, a network-connected central home hub, a laptop computer, an IoT device, or any other appropriate electronic platform, or it may be executed by either the deadbolt component 120, strike plate component 130, or combination thereof.

The door status model 750 may also be referred to as a "machine learning model" or a "mathematical model." The door status model 750 may be a model based on one or more algorithms which can assimilate data and make data-driven predictions and/or decisions based on that data. The door status model 750 may be based on any appropriate machine learning algorithm, including, but not limited to, decision tree learning (e.g., using random forests), association rule learning, neural networks, deep learning, inductive logic programming, support vector machines, cluster analysis, Bayesian networks, reinforcement learning, representation learning, similarity and metric learning, sparse dictionary learning, genetic algorithms, rule-based machine learning, or learning classifier systems.

The door status model 750 uses the data received from one or more sensors 600 and other network-connected devices, as provided by the preprocessor, to determine if the door is open or closed, if the door lock is engaged, and, in some embodiments, the relative position of the door. The door status model 750 may provide a weight factor to data received based on the source of the data. For example, data received from a proximity sensor indicating the physical deadbolt is in position within the latch hole of the door jamb may be weighted more heavily than data received from a temperature sensor reporting a temperature variation detected near the door. In other embodiments, the model simply classifies the door into statuses (e.g., locked or unlocked) without corresponding confidence values.

In an embodiment, the door status model 750 uses data from multiple sources to determine a confidence factor associated with a door status. For example, the door status model 750 may combine data from status messages from the deadbolt component 120 and/or strike plate component 130, data from an infrared light sensor mounted near the door, data from a temperature sensor, and data from RFID sensors mounted on or near the lock components. If all or most of the data sources used appear to agree on the status (for example, they all agree the door is "locked"), then the confidence factor would be high (for example, 100%). If there is disagreement in the data sources used regarding the status of the lock (for example, the lock components say they are mechanically engaged but a light level detected near the door indicates it is open), then a lower confidence factor may be determined. The door status model 750 may determine door status 755 based on the confidence factor computed. For example, the door status model 750 may indicate the door is locked if there is a confidence factor over a certain threshold that the door is locked.

It should be appreciated that alternate embodiments may have numerous variations from that described above in FIG. 7. For example, some or all of the data captured for use in the door status system 700 may pass through a central, network-connected hub. In another example, the door status system 700 may only be used only if the deadbolt component 120 and strike plate component 130 do not agree on the status of the door lock, or if there is reason to believe the messages from those components are less than reliable. Other variations are within the spirit of the present disclosure.

Figure 8:
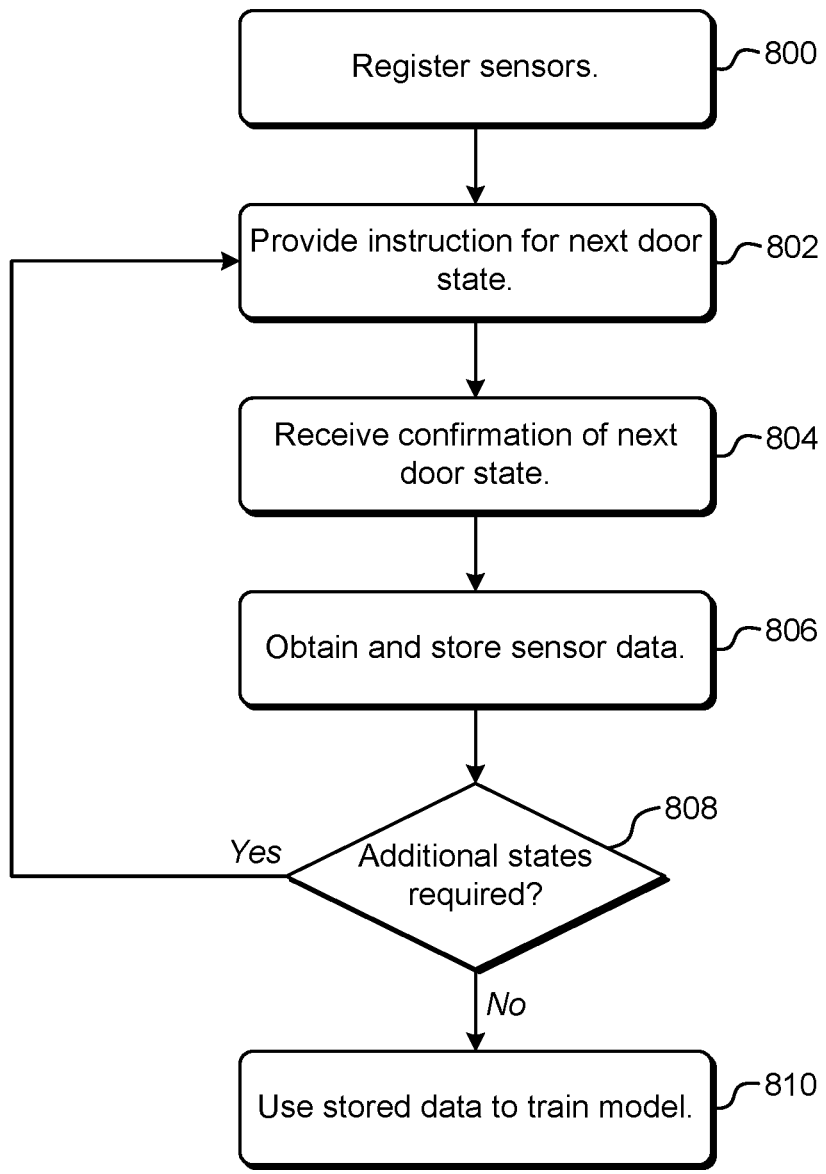
FIG. 8 illustrates an example flowchart for a door status system in accordance with an embodiment.

FIG. 8 illustrates an example flowchart for a configuration or training process for a door status system in accordance with an embodiment. In an embodiment, the device or system component hosting the door status system 700 of FIG. 7 may require "training" by a configuration procedure to detect and identify system-connected sensors and components. FIG. 8 illustrates an embodiment of such a configuration procedure.

At initial system start-up, or when commanded by a user, the system registers any available sensors (Step 800). This sensor registration process may be partially or fully automated, or may require input from a user. Upon completion or confirmation of the registration of all available sensors (as appropriate), the system provides instructions to a user to place the door on which the network-enabled door lock is located into a known position (Step 802). For example, the system may command the user to close the door but to leave it unlocked. In another example, the system may command the user to open the door halfway and then to manually extend the deadbolt. The user then confirms that the door is in the requested configuration (Step 804), and the system responds to the confirmation by taking readings from all sensors and storing the data (Step 806). After a sensor read is completed, the algorithm determines if there are additional door states required to complete the set-up procedure (Step 808). If there are additional states required, the system loops to Step 802 and the next door state is commanded. If there are no additional door states required, the system completes the configuration process by using all data stored to train the door status model (Step 810).

In an embodiment, the process of FIG. 8 may be an initial registration process with a limited number of door states, and additional "registration" and/or training may be accomplished over time by the system automatically. That is, continued collection of data from sensors may allow the system to generate additional data points through continued normal use of the system, providing additional confidence in the assessment of the door state.

Figure 9:
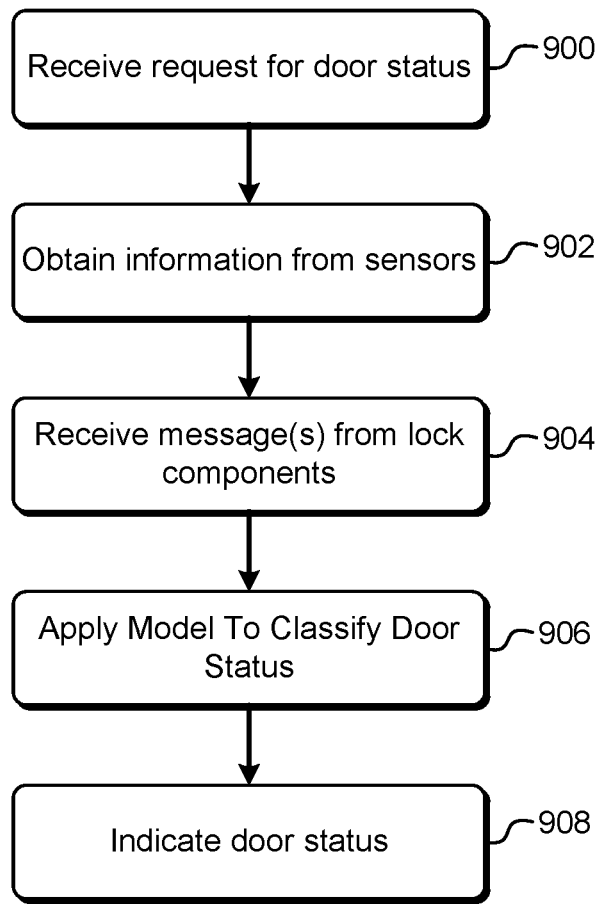
FIG. 9 illustrates an example flowchart for a network-enabled consumer device in accordance with an embodiment.

FIG. 9 illustrates an example flowchart for a network-enabled consumer device hosting the door status system of FIG. 7, in accordance with an embodiment. The device receives a request to determine the status of the door and the network-enabled door lock (Step 900). This request might be in the form of a user request received from a user device, such as a mobile phone or tablet, or may be initiated automatically when triggered by a change in sensor data (such as the detection of a change in a proximity sensor mounted integral to a component of the door lock).

Once the request is received, the device requests data from each of the sensors or devices registered to the system (Step 902), and receives messages from one or both lock components (Step 904). In some embodiments, some or all sensors may not be able to respond to requests for data. They may, for instance, push data to a network address or other location that collects the data. In such embodiments, a system performing the process of FIG. 9 may store sensor data (e.g., in a buffer) and use data that has been received within some predetermined amount of time from the present (e.g., within 5 seconds). In some examples, the amount of time before such data that is stored expires may depend on the type of data. Temperature data, which changes slowly, may be allowed to be older and still be used than other data (e.g., light data) which may change more rapidly. After obtaining data, in an embodiment, the device executes the door status model on the data inputs to determine the door status (Step 906). Finally, the door status is indicated to a user or transmitted to an external device or system (Step 908).

Figure 10:
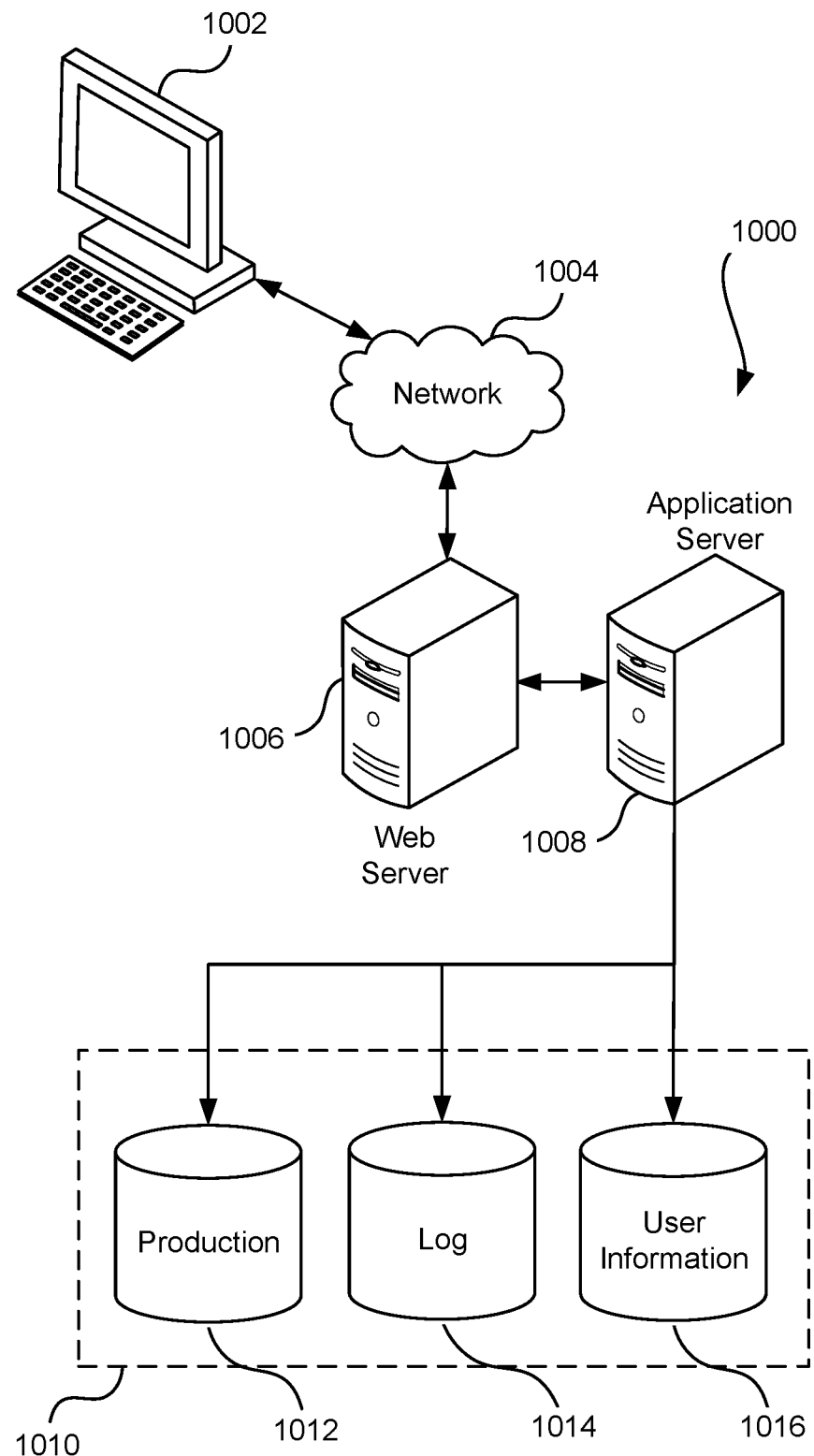
FIG. 10 illustrates a system in which various embodiments can be implemented.

FIG. 10 illustrates aspects of an example system 1000 for implementing aspects in accordance with an embodiment. As will be appreciated, although a web-based system is used for purposes of explanation, different systems may be used, as appropriate, to implement various embodiments. In an embodiment, the system includes an electronic client device 1002, which includes any appropriate device operable to send and/or receive requests, messages, or information over an appropriate network 1004 and convey information back to a user of the device. Examples of such client devices include personal computers, cellular or other mobile phones, handheld messaging devices, laptop computers, tablet computers, set-top boxes, personal data assistants, network-enabled "Internet of Things" devices, embedded computer systems, electronic book readers, and the like. In an embodiment, the network includes any appropriate network, including an intranet, the Internet, a cellular network, a local area network, a satellite network or any other such network and/or combination thereof and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly-addressable communications network, as the system includes a web server 1006 for receiving requests and serving content in response thereto, although for other networks an alternative device serving a similar purpose could be used as would be apparent to one of ordinary skill in the art.

In an embodiment, the illustrative system includes at least one application server 1008 and a data store 1010 and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including, but not limited to, text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including, but not limited to, forms that are perceptible to the user audibly, visually and/or through other senses. The handling of all requests and responses, as well as the delivery of content between the client device 1002 and the application server 1008, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 1010, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 1012 and user information 1016, which are used to serve content for the production side. The data store also is shown to include a mechanism for storing log data 1014, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 1010.

The data store 1010, in an embodiment, is operable, through logic associated therewith, to receive instructions from the application server 1008 and obtain, update or otherwise process data in response thereto and the application server 1008 provides static, dynamic, or a combination of static and dynamic data in response to the received instructions. In an embodiment, dynamic data, such as data used in web logs (blogs), shopping applications, news services, and other such applications are generated by server-side structured languages as described herein or are provided by a content management system ("CMS") operating on, or under the control of, the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user (client) device 1002. Continuing with example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 1000 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed (i.e., as a result of being executed) by a processor of the server, cause or otherwise allow the server to perform its intended functions.

The system 1000, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols and such a system also includes a number of workstations running any of a variety of commercially-available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, and other virtual devices or non-virtual devices supporting virtualization capable of communicating via a network.

In an embodiment, a system utilizes at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that run one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle °, Microsoft °, Sybase °, and IBM as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, a non-transitory computer-readable storage medium store instructions and a main CPU execute some of the instructions while a graphics processor unit executes other instructions. In an embodiment, different components of a computer system have separate processors and different processors execute different subsets of the instructions.

Accordingly, in an embodiment, computer systems are configured to implement one or more services that singly or collectively perform operations of processes described herein and such computer systems are configured with applicable hardware and/or software that enable the performance of the operations. Further, a computer system that implement an embodiment of the present disclosure is a single device and, in another embodiment, is a distributed computer systems comprising multiple devices that operate differently such that the distributed computer system performs the operations described herein and such that a single device does not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

Embodiments of the disclosure can be described in view of the following clauses:

1. A method, comprising:
    determining, at a first component of a lock, a nonce;
    wirelessly transmitting the nonce to a second component of the lock, the first component and second component selectively mechanically engagable with one another to prevent relative movement in at least one direction between the first component and second component to prevent opening of a door;
    receiving, at the first component, a first message;
    using a cryptographic key associated with the second component and the nonce to validate the first message; and
    as a result of determining that the first message is valid, transmitting a second message indicating that the first component and second component have become mechanically engaged with one another.

2. The method of clause 1, wherein the first component is a deadbolt component and the second component is a strike plate component.

3. The method of clause 1, wherein the first component is a strike plate component and the second component is a deadbolt component.

4. The method of clause 1, further comprising:
    receiving, at the first component, a third message, the third message containing a second nonce;
    performing a cryptographic operation with the second nonce and a cryptographic key of the first component to create an encrypted second nonce; and
    transmitting a fourth message containing the encrypted second nonce to the second component.

5. A lock, comprising:
    a first component, wherein:
        the first component is engagable with a second component to prevent relative motion in at least one direction between the first component and second component; and
        the first component operates according to logic to:
            transmit a nonce;
            receive a message;
            use the nonce and a cryptographic key associated with the second component to validate the message; and
            as a result of the message being valid, indicate whether the first component and second component are engaged with one another.

6. The lock of clause 5, further comprising the second component, wherein the message is generated by the second component.

7. The lock of clause 6, wherein the second component generates the message by performing a cryptographic operation with the nonce and a cryptographic key associated with the second component to create an encrypted nonce, and transmitting the encrypted nonce in the message to the first component.

8. The lock of clause 7, wherein the message is a first message and the nonce is a first nonce, and wherein the first component further operates according to logic to:
    receive a second nonce from the second component;
    encrypt the second nonce with a cryptographic key of the first component to create an encrypted second nonce; and
    transmit a second message containing the encrypted second nonce to the second component.

9. The lock of clause 8, wherein the second component operates according to logic to:
    receive the second message;
    use the second nonce and a cryptographic key associated with the first component to validate the second message; and
    as a result of the second message being valid, indicate whether the first component and second component are mechanically engaged with one another.

10. The lock of clause 6, wherein the first component is a deadbolt component of the lock, and the second component is a strike plate component of the lock.

11. The lock of clause 6, wherein the first component is a strike plate component of the lock, and the second component is a deadbolt component of the lock.

12. The lock of clause 5, wherein indicating whether the first component and second component are mechanically engaged with one another comprises transmitting a message to a user device that is separate from the first component and second component.

13. A system, comprising:
    a first component that:
        interfaces with a second component to prevent relative motion between the first component and second component; and
        uses a nonce and cryptographic key to verify relative motion with the second component is prevented in at least one direction.

14. The system of clause 13, the system further comprising the second component.

15. The system of clause 13, wherein using a nonce and cryptographic key to verify relative motion with the second component is prevented comprises:
    generating, at the first component, a first nonce;
    transmitting the first nonce to a second component;
    receiving a message from the second component; and using the first nonce and a cryptographic key associated with the second component to validate the message.
16. The system of clause 13, further comprising indicating that the first component is mechanically engaged with the second component.
17. The system of clause 16, wherein indicating the first component is mechanically engaged with the second component comprises transmitting a second message to a user device that is separate from the first component and second component.
18. The system of clause 13, wherein the first component is a deadbolt component of a lock, and the second component is a strike plate component of a lock.
19. The system of clause 13, wherein the first component verifies mechanical engagement with the second component by at least inputting a message from the second component and the cryptographic key into a cryptographic algorithm to cryptographically verify that a message matches the nonce.
20. The system of clause 13, wherein using a nonce and cryptographic key to verify relative motion with the second component is prevented comprises a first nonce and a first cryptographic key from the first component, and a second nonce and a second cryptographic key from the second component.
21. A computer-implemented method, comprising:
obtaining, from a plurality of sensing devices of different types, information indicating measurements of an environment associated with a door;
generating, based at least in part on the information, a set of inputs to a machine-learning model;
inputting the set of inputs into the machine learning model to determine a status associated with the door;
generating a message that indicates the status of the door; and
transmitting the message to a network address associated with the door.
22. The computer-implemented method of clause 21, wherein the measurements of the environment associated with the door comprise one or more measurements of the door.
23. The computer-implemented method of clause 21, wherein the measurements of the environment associated with the door comprise one or more measurements of a door lock associated with the door.
24. The computer-implemented method of clause 21, further comprising training the machine learning model, wherein training the machine learning model comprises:
obtaining, from the plurality of sensing devices, training information indicating measurements of the environment associated with the door when the door has a first status; and
using the training information to train the model.
25. A system, comprising one or more devices that implement a set of services, wherein the set of services:
obtains data resulting from a plurality of measurements associated with an environment of a physical access control mechanism;
determines, based at least in part on the data and a model, a status associated with the physical access control mechanism; and
indicates the status.
26. The system of clause 25, wherein the plurality of measurements associated with the environment of the physical access control mechanism comprise one or more measurements of a lock associated with the physical access control mechanism.
27. The system of clause 25, wherein the set of services further trains the model, by at least:
obtaining a plurality of measurements associated with the environment of the physical access control mechanism with the physical access control mechanism in a first state; and
using the state and the plurality of measurements to train the machine learning model.
28. The system of clause 25, wherein the status associated with the physical access control mechanism indicates whether a lock associated with the physical access control mechanism is engaged to prevent the physical access control mechanism from allowing access to a physical space.
29. The system of clause 25, wherein the status associated with the physical access control mechanism is that a first component of a lock has mechanically engaged with a second component of a lock.
30. The system of clause 25, wherein the data is obtained from a plurality of sensing devices that obtain different types of measurements.
31. The system of clause 30, wherein the plurality of measurements comprises at least two of an acoustic measurement, a light measurement, a distance measurement, a position measurement, an inertial measurement, a chemical measurement, or a temperature measurement.
32. The system of clause 30, wherein the sensing devices comprise one or more components of a lock of the physical access control mechanism.
33. A non-transitory computer-readable storage medium having stored thereon instructions executable by one or more processors of a computer system to cause the computer system to:
obtain data indicating measurements of different aspects of an environment associated with a physical access control mechanism;
use a model to determine a status of a physical access control mechanism indicated by the measurements; and
transmit a message indicating the status.
34. The non-transitory computer-readable storage medium of clause 33, wherein the measurements of different aspects of the environment associated with the physical access control mechanism comprise one or more measurements of a door.
35. The non-transitory computer-readable storage medium of clause 33, wherein the measurements of different aspects of the environment associated with the physical access control mechanism comprise one or more measurements of a door lock associated with a door.
36. The non-transitory computer-readable storage medium of clause 35, wherein the one or more measurements of a door lock comprise a cryptographically verified engagement of a first component of the door lock with a second component of the door lock.
37. The non-transitory computer-readable storage medium of clause 33, wherein:
the model determines a confidence factor based at least in part on the measurements; and
the determining the status of the physical access control mechanism is based at least in part on the confidence factor exceeding a threshold.
38. The non-transitory computer-readable storage medium of clause 37, wherein the confidence factor represents a likelihood that the status of the physical access control mechanism is accurate.

39. The non-transitory computer-readable storage medium of clause 33, wherein the message is transmitted to a network address associated with a user of the door.

40. The non-transitory computer-readable storage medium of clause 33, wherein the measurements of different aspects of an environment associated with a door are obtained from a plurality of sensing devices of different types.

All references, including publications, patent applications, and patents, cited herein are hereby incorporated by reference to the same extent as if each reference were individually and specifically indicated to be incorporated by reference and were set forth in its entirety herein.

What is claimed is:

1. A method, comprising:
   determining, at a first component of a lock, a nonce;
   wirelessly transmitting the nonce to a second component of the lock, the first component and second component selectively mechanically engageable with one another to prevent relative movement in at least one direction between the first component and second component to prevent opening of a door;
   receiving, at the first component, a first message from the second component;
   using a cryptographic key associated with the second component and the nonce to verify the first message; and
   as a result of determining that the first message is verified, transmitting a second message to a computing device indicating that the first component and second component have become mechanically engaged with one another.

2. The method of claim 1, wherein the first component is a deadbolt component and the second component is a strike plate component.

3. The method of claim 1, wherein the first component is a strike plate component and the second component is a deadbolt component.

4. The method of claim 1, further comprising:
   receiving, at the first component, a third message, the third message containing a second nonce;
   performing a cryptographic operation with the second nonce and a cryptographic key of the first component to create an encrypted second nonce; and
   transmitting a fourth message containing the encrypted second nonce to the second component.

5. A lock mechanism, comprising:
   a first component and a second component, wherein:
   the first component is configured to be engageable with the second component to prevent relative motion in at least one direction between the first component and the second component; and
   the first component is configured to operate according to logic to:
      transmit a nonce to the second component;
      receive a message from the second component in response to transmitting the nonce;
      use the nonce and a cryptographic key to verify the message; and
      as a result of the message being verified, by the first component, providing an indication to a computing device whether the first component and the second component is in an engaged position.

6. The lock mechanism of claim 5, wherein both the first component and the second component comprise one or more sensors to detect a status of the lock mechanism.

7. The lock mechanism of claim 5, wherein the second component generates the message by performing a cryptographic operation with the transmitted nonce and a cryptographic key associated with the second component to create an encrypted nonce, and transmitting the encrypted nonce in the message to the first component.

8. The lock mechanism of claim 7, wherein the first component is further configured to operate according to logic to:
   receive a second nonce;
   encrypt the second nonce with a cryptographic key of the first component to create an encrypted second nonce; and
   transmit a second message containing the encrypted second nonce to the second component.

9. The lock mechanism of claim 8, wherein the second component operates according to logic to:
   receive the second message;
   use the second nonce and a cryptographic key associated with the first component to verify the second message; and
   as a result of the second message being verified, provide an indication to the computing device whether the first component and the second component are in an engaged position.

10. The lock mechanism of claim 5, wherein the first component is a deadbolt component of the lock mechanism, and the second component is a strike plate component of the lock mechanism.

11. The lock mechanism of claim 5, wherein the first component is a strike plate component of the lock mechanism, and the second component is a deadbolt component of the lock mechanism.

12. The lock mechanism of claim 5, wherein providing the indication whether the first component and the second component are in the engaged position comprises transmitting a message to the computing device that is separate from the first component and the second component.

13. A system, comprising:
   a first component and a second component, wherein:
   the first component is configured to interface with the second component to prevent relative motion in at least one direction between the first component and the second component; and
   the first component is configured to operate according to logic to:
      transmit a nonce to the second component;
      use the nonce and a cryptographic key associated with the second component to verify a message received from the second component in response to transmitting the nonce; and
      as a result of the message being verified, provide an indication that indicates whether relative motion of the first component is prevented in the at least one direction.

14. The system of claim 13, wherein the system further provides the indication to a computing device indicating whether the first component is engaged with the second component.

15. The system of claim 14, wherein providing the indication further includes sending a message, from the system, to the computing device indicating that the first component is mechanically engaged with the second component.

16. The system of claim 15, wherein the computing device is located separately from the first component and the second component.

17. The system of claim 13, wherein both the first component and the second component comprise one or more sensors to detect a status of the system.

18. The system of claim 13, wherein the first component is a deadbolt component of the system, and the second component is a strike plate component of the system.

19. The system of claim 13, wherein the first component verifies mechanical engagement with the second component by at least inputting a message from the second component and the cryptographic key into a cryptographic algorithm to cryptographically verify that the message matches the nonce.

20. The system of claim 13, further comprising the first component that is configured to:
    obtain a second nonce;
    encrypt the second nonce with a cryptographic key of the first component to create an encrypted second nonce; and
    transmit a second message containing the encrypted second nonce to the second component.

\* \* \* \* \*